US012391593B2

(12) United States Patent
Tada et al.

(10) Patent No.: US 12,391,593 B2
(45) Date of Patent: Aug. 19, 2025

(54) WATER TREATMENT METHOD AND WATER TREATMENT APPARATUS

(71) Applicant: KURITA WATER INDUSTRIES LTD., Tokyo (JP)

(72) Inventors: Keijirou Tada, Tokyo (JP); Muneaki Matsuda, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 392 days.

(21) Appl. No.: 17/928,929

(22) PCT Filed: May 18, 2021

(86) PCT No.: PCT/JP2021/018796
§ 371 (c)(1),
(2) Date: Dec. 1, 2022

(87) PCT Pub. No.: WO2021/246161
PCT Pub. Date: Dec. 9, 2021

(65) Prior Publication Data
US 2023/0227342 A1  Jul. 20, 2023

(30) Foreign Application Priority Data

Jun. 1, 2020  (JP) ................................. 2020-095303

(51) Int. Cl.
*B01D 61/02* (2006.01)
*B01D 61/14* (2006.01)
(Continued)

(52) U.S. Cl.
CPC ................ *C02F 9/00* (2013.01); *B01D 61/58* (2013.01); *B01D 65/02* (2013.01); *C02F 1/008* (2013.01);
(Continued)

(58) Field of Classification Search
CPC .......... C02F 9/00; C02F 1/008; C02F 1/5209; C02F 1/441; C02F 1/444; C02F 1/56;
(Continued)

(56) References Cited

U.S. PATENT DOCUMENTS 10,913,675 B1 * 2/2021 Banker ..................... C02F 9/00
2003/0183575 A1 * 10/2003 Zeiher .................... B01D 61/54
210/639

(Continued)

FOREIGN PATENT DOCUMENTS

CN      104785118       7/2015
JP      2009248028      10/2009
(Continued)

OTHER PUBLICATIONS

English translation of Patent Publication JP 2016131937A, published Jul. 25, 2016. (Year: 2016).*

(Continued)

*Primary Examiner* — Joseph W Drodge
(74) *Attorney, Agent, or Firm* — JCIPRNET

(57) ABSTRACT

The water treatment apparatus of the present invention comprises a flocculation part into which water to be treated is introduced, at least two flocculant adding devices installed so that different flocculants can be added to the flocculation part, one or two or more water quality measurement devices for measuring the quality of the water to be treated, and a controlling part for issuing, on the basis of the measurement result from the water quality measurement device(s), a command relating to whether addition of the flocculants to the corresponding flocculant adding device is required or not and to the added amounts of the flocculants, wherein at least one of the flocculant adding devices is an auxiliary flocculant adding device.

11 Claims, 4 Drawing Sheets

(51) Int. Cl.
  B01D 61/58  (2006.01)
  B01D 65/02  (2006.01)
  C02F 1/00  (2023.01)
  C02F 1/44  (2023.01)
  C02F 1/52  (2023.01)
  C02F 1/56  (2023.01)
  C02F 1/66  (2023.01)
  C02F 1/76  (2023.01)
  C02F 9/00  (2023.01)

(52) U.S. Cl.
  CPC .......... *C02F 1/5209* (2013.01); *B01D 61/025* (2013.01); *B01D 61/145* (2013.01); *B01D 2313/70* (2022.08); *B01D 2321/16* (2013.01); *C02F 1/441* (2013.01); *C02F 1/444* (2013.01); *C02F 1/56* (2013.01); *C02F 1/66* (2013.01); *C02F 1/76* (2013.01); *C02F 2209/06* (2013.01); *C02F 2303/16* (2013.01); *C02F 2303/20* (2013.01)

(58) Field of Classification Search
  CPC .......... C02F 1/66; C02F 1/76; C02F 2209/06; C02F 2303/16; C02F 2303/20; C02F 1/001; C02F 1/5245; C02F 2209/005; C02F 2209/11; C02F 2209/40; C02F 1/44; C02F 1/52; B01D 61/58; B01D 65/02; B01D 61/025; B01D 61/145; B01D 2313/70; B01D 2321/16; B01D 61/026; B01D 65/08; B01D 61/147; B01D 2311/04; B01D 2311/12; B01D 2311/2642; B01D 61/04; B01D 61/029; B01D 61/12; B01D 61/16; B01D 61/22; B01D 61/32; B01D 2311/06; B01D 2311/2649; B01D 2321/162; Y02A 20/131
  USPC ............................................ 210/321.69, 636
  See application file for complete search history.

(56) References Cited

U.S. PATENT DOCUMENTS

| | | | | |
|---|---|---|---|---|
| 2007/0175810 | A1* | 8/2007 | Donaque | B01D 21/0012 210/205 |
| 2011/0094963 | A1* | 4/2011 | Tada | C02F 1/56 210/636 |
| 2011/0297614 | A1* | 12/2011 | Ikuno | C02F 9/00 424/661 |
| 2012/0241377 | A1* | 9/2012 | Ooi | C02F 1/56 524/541 |
| 2013/0206696 | A1* | 8/2013 | Roberts | C02F 9/00 210/652 |
| 2017/0001889 | A1* | 1/2017 | Ireland | C02F 9/00 |
| 2018/0370825 | A1* | 12/2018 | Ooi | B01D 21/01 |
| 2020/0079661 | A1* | 3/2020 | Criswell | C02F 1/24 |

FOREIGN PATENT DOCUMENTS

| | | |
|---|---|---|
| JP | 5407994 | 2/2014 |
| JP | 2014211327 | 11/2014 |
| JP | 2015134327 | 7/2015 |
| JP | 2015157265 | 9/2015 |
| JP | 2016131937 | 7/2016 |
| JP | 2016221500 | 12/2016 |
| JP | 2017131871 | 8/2017 |
| JP | 2018083162 | 5/2018 |
| KR | 20100116847 | 11/2010 |
| TW | 201945294 | 12/2019 |
| WO | WO-2011095869 A1 * | 8/2011 .............. B01D 61/58 |
| WO | WO-2012111402 A1 * | 8/2012 ............ B01D 61/025 |

OTHER PUBLICATIONS

English translation of Patent Publication JP 2015134317A, published Jul. 27, 2015. (Year: 2015).*

English translation of patent publication JP2015134327. (Year: 2015).*

English translation of patent publication JP2016131937. (Year: 2016).*

"International Search Report (Form PCT/ISA/210) of PCT/JP2021/018796," mailed on Jul. 20, 2021, with English translation thereof, pp. 1-4.

Office Action of Taiwan Counterpart Application, with English translation thereof, issued on Feb. 1, 2024, pp. 1-29.

Decision of Refusal of China Counterpart Application, with English translation thereof, issued on Sep. 6, 2023, pp. 1-12.

"Office Action of China Counterpart Application", issued on Apr. 22, 2023, with English translation thereof, pp. 1-17.

Office Action of Korea Counterpart Application, with English translation thereof, issued on Apr. 17, 2024, pp. 1-35.

* cited by examiner

WATER TREATMENT METHOD AND WATER TREATMENT APPARATUS

CROSS-REFERENCE TO RELATED APPLICATION

This application is a 371 application of an international PCT application serial no. PCT/JP2021/018796, filed on May 18, 2021, which claims the priority benefit of Japan application JP2020-095303, filed on Jun. 1, 2020. The entirety of each of the above-mentioned patent applications is hereby incorporated by reference herein and made a part of this specification.

TECHNICAL FIELD

The present invention relates to a water treatment method and a water treatment apparatus.

BACKGROUND ART

Membrane filtration treatment using a filtration membrane is widely utilized as means for separating and removing inorganic matter (suspended substances) and organic matter in water to be treated. Moreover, desalination of membrane filtration-treated water After membrane filtration treatment through reverse osmosis membrane treatment using a reverse osmosis membrane is performed in the field of pure water production and the field of wastewater recovery.

Microfiltration membranes (MF membranes) or ultrafiltration membranes (UF membranes) are used as filtration membranes. Membranes having a pore size of approximately 1 μm are generally used as MF membranes, and membranes having a pore size of 0.005 to 0.5 μm are generally used as UF membranes. Membrane filtration treatment using these filtration membranes has a problem that clogging is likely to occur in the filtration membrane if water to be treated includes a large amount of inorganic matter or organic matter. In addition, there is concern that inorganic matter or organic matter may be mixed in with membrane filtration-treated water After membrane filtration treatment, causing problems that a reverse osmosis membrane (RO membrane) is likely to be contaminated or the like due to precipitation of scale or biofouling at the time of desalination treatment. In order to avoid such problems, a flocculant is added to water to be treated before the water to be treated is subjected to membrane filtration treatment, inorganic matter or organic matter included in the water to be treated is caused to flocculate into coarse particles, and then they are separated and removed through membrane filtration treatment (Patent Literature 1).

CITATION LIST

Patent Literature

Patent Literature 1

Japanese Patent No. 5407994

SUMMARY OF INVENTION

Technical Problem

An effect of flocculating inorganic matter or organic matter using a flocculant varies depending on various factors such as a kind and a concentration of inorganic matter or organic matter included in water to be treated. For this reason, a kind and an added amount of a flocculant are generally determined by performing a desk test using water to be treated in advance. However, water treatment apparatuses in the related art designed on the basis of the kind or the added amount of a flocculant determined through a desk test have a problem that when the quality of water to be treated has fluctuated, for example, due to variation in the kind or the concentration of inorganic matter or organic matter included in water to be treated, increase or decrease in amount of water to be treated, or the like and easiness of flocculation of inorganic matter or organic matter has changed, it is difficult to cope therewith, resulting in poor scalability.

In addition, in membrane filtration treatment, in order to avoid deterioration in filtration efficiency caused by coarse particles which have been separated and removed by a filtration membrane, the filtration membrane is cleaned using a cleaning agent. Coarse particles separated and removed by a filtration membrane vary depending on various factors such as the kind or the amount of inorganic matter or organic matter included in water to be treated. For this reason, the kind and the added amount of a filtration membrane cleaning agent are generally determined by performing a desk test using water to be treated in advance. However, water treatment apparatuses having a membrane filtration treatment part in the related art designed on the basis of the kind or the added amount of a filtration membrane cleaning agent determined through a desk test have a problem that, for example, when the quality of water to be treated has fluctuated and the kind or the generated amount of coarse particles generated due to flocculation of inorganic matter or organic matter has changed, it is difficult to cope with the change, resulting in poor scalability.

Moreover, in reverse osmosis membrane treatment, in order to avoid deterioration in desalination efficiency caused by adhered matter which has adhered to a surface of a reverse osmosis membrane, occurrence of adhered matter is curbed by adding a water quality adjuster to water to be treated, or a reverse osmosis membrane is cleaned using a cleaning agent. Adhered matter which has adhered to a reverse osmosis membrane vary depending on various factors such as a kind and a concentration of inorganic matter or organic matter included in water to be treated. For this reason, a kind and an added amount of a water quality adjuster or a reverse osmosis membrane cleaning agent are generally determined by performing a desk test using water to be treated in advance. However, water treatment apparatuses having a reverse osmosis membrane treatment part in the related art designed on the basis of the kind and the added amount of a water quality adjuster or a reverse osmosis membrane cleaning agent determined through a desk test have a problem that, for example, when the quality of water to be treated has fluctuated and a likelihood of occurrence of adhered matter or the kind or the adhered amount of adhered matter has changed, it is difficult to cope with the change, resulting in poor scalability.

The present invention has been made in consideration of the foregoing circumstances, and an objective thereof is to provide a water treatment method and a water treatment apparatus, in which treatment of water to be treated can be stably performed even when a quality of water to be treated has fluctuated and which have high scalability.

Solution to Problem

In order to resolve the foregoing problems, the present invention employs the following constitutions.

[1] A water treatment method uses a water treatment apparatus which includes a flocculation part into which water to be treated is introduced and at least two flocculant adding devices which have been installed in advance to be able to add different flocculants to the flocculation part, and in which at least one of the flocculant adding devices is an auxiliary flocculant adding device. When a quality of the water to be treated has fluctuated, adding a new flocculant corresponding to the quality of the water to be treated to the flocculation part from the flocculant adding device serving as an auxiliary flocculant adding device, stopping addition of a flocculant, changing an added amount of a flocculant, or changing a kind of a flocculant is started.

[2] In the water treatment method according to [1], the water treatment apparatus has a membrane filtration treatment part on a downstream side of the flocculation part. The membrane filtration treatment part includes a filtration membrane which performs membrane filtration treatment of water to be treated, and at least two filtration membrane cleaning agent adding devices which have been installed in advance to be able to add different filtration membrane cleaning agents to the filtration membrane. At least one of the filtration membrane cleaning agent adding devices is an auxiliary filtration membrane cleaning agent adding device. When a quality of the water to be treated has fluctuated, adding a new filtration membrane cleaning agent corresponding to the quality of the water to be treated to the filtration membrane from the filtration membrane cleaning agent adding device serving as an auxiliary filtration membrane cleaning agent adding device, stopping addition of a filtration membrane cleaning agent, changing an added amount of a filtration membrane cleaning agent, or changing a kind of a filtration membrane cleaning agent is started.

[3] In the water treatment method according to [2], the water treatment apparatus has a reverse osmosis membrane treatment part on a downstream side of the membrane filtration treatment part. The reverse osmosis membrane treatment part includes a reverse osmosis membrane which performs reverse osmosis membrane treatment of water to be treated, and at least two water quality adjuster adding devices which have been installed in advance to be able to add different water quality adjusters to the water to be treated. At least one of the water quality adjuster adding devices is an auxiliary water quality adjuster adding device. When a quality of the water to be treated has fluctuated, adding a new water quality adjuster corresponding to the quality of the water to be treated to the water to be treated from the water quality adjuster adding device serving as an auxiliary water quality adjuster adding device, stopping addition of a water quality adjuster, changing an added amount of a water quality adjuster, or changing a kind of a water quality adjuster is started.

[4] In the water treatment method according to [2], the water treatment apparatus has a reverse osmosis membrane treatment part on a downstream side of the membrane filtration treatment part. The reverse osmosis membrane treatment part includes a reverse osmosis membrane which performs reverse osmosis membrane treatment of water to be treated, and at least two reverse osmosis membrane cleaning agent adding devices which have been installed in advance to be able to add different reverse osmosis membrane cleaning agents to the reverse osmosis membrane. At least one of the reverse osmosis membrane cleaning agent adding devices is an auxiliary reverse osmosis membrane cleaning agent adding device. When a quality of the water to be treated has fluctuated, adding a new reverse osmosis membrane cleaning agent corresponding to the quality of the water to be treated to the reverse osmosis membrane from the reverse osmosis membrane cleaning agent adding device serving as an auxiliary reverse osmosis membrane cleaning agent adding device, stopping addition of a reverse osmosis membrane cleaning agent, changing an added amount of a reverse osmosis membrane cleaning agent, or changing a kind of a reverse osmosis membrane cleaning agent is started.

[5] A water treatment apparatus includes a flocculation part into which water to be treated is introduced; at least two flocculant adding devices which have been installed to be able to add different flocculants to the flocculation part; one or two or more water quality measurement devices which measure a quality of the water to be treated; and a controlling part which issues, on the basis of measurement results from the water quality measurement device(s), a command relating to whether addition of the flocculants is required or not and to added amounts of the flocculants to the corresponding flocculant adding devices. At least one of the flocculant adding devices is an auxiliary flocculant adding device.

[6] In the water treatment apparatus according to [5], the flocculation part is constituted of at least the two flocculation tanks respectively corresponding to at least the two water quality measurement devices, and at least the two flocculation tanks are connected to each other in series.

[7] The water treatment apparatus according to [5] or [6] further includes a membrane filtration treatment part and a reverse osmosis membrane treatment part on a downstream side of the flocculation part.

[8] In the water treatment apparatus according to [7], the membrane filtration treatment part includes a filtration membrane which performs membrane filtration treatment of water to be treated; at least two filtration membrane cleaning agent adding devices which have been installed in advance to be able to add different filtration membrane cleaning agents to the filtration membrane; one or two or more water quality measurement devices which measure a quality of the water to be treated, and a controlling part which issues, on the basis of measurement results from the water quality measurement device(s), a command relating to whether addition of the filtration membrane cleaning agents is required or not and to added amounts of the filtration membrane cleaning agents to the corresponding filtration membrane cleaning agent adding devices. At least one of the filtration membrane cleaning agent adding devices is an auxiliary filtration membrane cleaning agent adding device.

[9] In the water treatment apparatus according to [7], the reverse osmosis membrane treatment part includes a reverse osmosis membrane which performs reverse osmosis membrane treatment of water to be treated; at least two water quality adjuster adding devices which have been installed in advance to be able to add different water quality adjusters to the water to be treated; one or two or more water quality measurement devices which measure a quality of the water to be treated; and a controlling part which issues, on the basis of measurement results from the water quality measurement device(s), a command relating to whether addition of the water quality adjusters is required or not and to added amounts of the water quality adjusters to the corresponding water quality adjuster adding devices. At least one of the water quality adjuster adding devices is an auxiliary water quality adjuster adding device.

[10] In the water treatment apparatus according to [7], the reverse osmosis membrane treatment part includes a reverse osmosis membrane which performs reverse osmosis membrane treatment of water to be treated; at least two reverse osmosis membrane cleaning agent adding devices which have been installed in advance to be able to add different reverse osmosis membrane cleaning agents to the reverse osmosis membrane; one or two or more water quality measurement devices which measure a quality of the water to be treated; and a controlling part which issues, on the basis of measurement results from the water quality measurement device(s), a command relating to whether addition of the reverse osmosis membrane cleaning agents is required or not and to added amounts of the reverse osmosis membrane cleaning agents to the corresponding reverse osmosis membrane cleaning agent adding devices. At least one of the reverse osmosis membrane cleaning agent adding devices is an auxiliary reverse osmosis membrane cleaning agent adding device.

Advantageous Effects of Invention

In the water treatment apparatus used in the water treatment method of the present invention, at least two flocculant adding devices are installed in advance to be able to add different flocculants to the flocculation part, and at least one of at least the two flocculant adding devices is an auxiliary flocculant adding device. For this reason, according to the water treatment method of the present invention, when the quality of water to be treated has fluctuated and easiness of flocculation of inorganic matter or organic matter in water to be treated has changed, it is possible to adopt countermeasures such as adding a new flocculant corresponding to the quality of the water to be treated to the flocculation part from the flocculant adding device serving as an auxiliary flocculant adding device, stopping addition of a flocculant, changing an added amount of a flocculant, or changing a kind of a flocculant. Further, by adopting these countermeasures, even when the quality of water to be treated has fluctuated, inorganic matter or organic matter in water to be treated can be caused to more reliably flocculate into coarse particles. Therefore, the water treatment method of the present invention has high scalability.

In addition, according to the water treatment method of the present invention, the water treatment apparatus has the membrane filtration treatment part on a downstream side of the flocculation part. In the membrane filtration treatment part, at least two filtration membrane cleaning agent adding devices are installed in advance to be able to add different filtration membrane cleaning agents to the filtration membrane. In a case in which at least one of at least the two filtration membrane cleaning agent adding devices is an auxiliary filtration membrane cleaning agent adding device, when the quality of water to be treated has fluctuated, it is possible to adopt countermeasures such as adding a new filtration membrane cleaning agent corresponding to the quality of the water to be treated to the filtration membrane from the filtration membrane cleaning agent adding device serving as an auxiliary filtration membrane cleaning agent adding device, stopping addition of a filtration membrane cleaning agent, changing an added amount of a filtration membrane cleaning agent, or changing a kind of a filtration membrane cleaning agent. Further, by adopting these countermeasures, even when the quality of water to be treated has fluctuated and the kind or the generated amount of coarse particles generated due to flocculation of inorganic matter or organic matter has changed, coarse particles separated and removed by the filtration membrane can be more reliably removed. Therefore, the water treatment method has higher scalability.

Moreover, according to the water treatment method of the present invention, the water treatment apparatus has the reverse osmosis membrane treatment part on a downstream side of the membrane filtration treatment part. In the reverse osmosis membrane treatment part, at least two water quality adjuster adding devices are installed in advance to be able to add different water quality adjusters to water to be treated. In a case in which at least one of at least the two water quality adjuster adding devices is an auxiliary water quality adjuster adding device, when the quality of water to be treated has fluctuated, it is possible to adopt countermeasures such as adding a new water quality adjuster corresponding to the quality of the water to be treated to the reverse osmosis membrane from the water quality adjuster adding device serving as an auxiliary water quality adjuster adding device, stopping addition of a water quality adjuster, changing an added amount of a water quality adjuster, or changing a kind of a water quality adjuster. Further, by adopting these countermeasures, even when the quality of water to be treated has fluctuated and a likelihood of occurrence of adhered matter onto the reverse osmosis membrane has changed, occurrence of adhered matter onto the reverse osmosis membrane can be more reliably curbed. Therefore, the water treatment method has higher scalability.

Furthermore, according to the water treatment method of the present invention, the water treatment apparatus has the reverse osmosis membrane treatment part on a downstream side of the membrane filtration treatment part. In the reverse osmosis membrane treatment part, at least two reverse osmosis membrane cleaning agent adding devices are installed in advance to be able to add different reverse osmosis membrane cleaning agents to the reverse osmosis membrane. In a case in which at least one of at least the two reverse osmosis membrane cleaning agent adding devices is an auxiliary reverse osmosis membrane cleaning agent adding device, when the quality of water to be treated has fluctuated, it is possible to adopt countermeasures such as adding a new reverse osmosis membrane cleaning agent corresponding to the quality of the water to be treated to the reverse osmosis membrane from the reverse osmosis membrane cleaning agent adding device serving as an auxiliary reverse osmosis membrane cleaning agent adding device, stopping addition of a reverse osmosis membrane cleaning agent, changing an added amount of a reverse osmosis membrane cleaning agent, or changing a kind of a reverse osmosis membrane cleaning agent. Further, by adopting these countermeasures, even when the quality of water to be treated has fluctuated and the kind or the amount of adhered matter which has adhered to the reverse osmosis membrane has changed, adhered matter which has adhered to the reverse osmosis membrane can be more reliably removed. Therefore, the water treatment method of the present invention has higher scalability.

According to the water treatment apparatus of the present invention, since at least two flocculant adding devices are installed in advance to be able to add different flocculants to the flocculation part and at least one of at least the two flocculant adding devices is an auxiliary flocculant adding device, when the quality of water to be treated has fluctuated and easiness of flocculation of inorganic matter or organic matter in water to be treated has changed, it is possible to adopt countermeasures such as adding a new flocculant corresponding to the quality of the water to be treated to the flocculation part from the flocculant adding device serving as an auxiliary flocculant adding device, stopping addition of a flocculant, changing an added amount of a flocculant, or changing a kind of a flocculant. In addition, according to the water treatment apparatus of the present invention, since whether addition of a flocculant is required or not and the added amount of a flocculant can be controlled on the basis of measurement results from the water quality measurement device, it is possible to promptly cope therewith in response to fluctuation of the quality of water to be treated.

In addition, according to the water treatment apparatus of the present invention, the flocculation part has a constitution constituted of at least two flocculation tanks respectively corresponding to at least the two flocculant adding devices, and at least the two flocculation tanks are connected to each other in series. Therefore, different flocculants can be added in stages. Accordingly, impairing a flocculation effect due to interference between different flocculants can be curbed, and thus an effect of adding a flocculant can be more reliably exhibited. Therefore, inorganic matter or organic matter included in water to be treated can be caused to more reliably flocculate into coarse particles.

Moreover, according to the water treatment apparatus of the present invention, the membrane filtration treatment part and the reverse osmosis membrane treatment part are provided on a downstream side of the flocculation part. Therefore, coarse particles included in water to be treated can be separated and removed by the membrane filtration treatment part, and water to be treated can be desalinated by the reverse osmosis membrane treatment part. Accordingly, water to be treated can become high-purity treated water.

Moreover, according to the water treatment apparatus of the present invention, at least two filtration membrane cleaning agent adding devices provided in the membrane filtration treatment part are installed in advance to be able to add different filtration membrane cleaning agents to the filtration membrane, and at least one of at least the two filtration membrane cleaning agent adding devices is an auxiliary filtration membrane cleaning agent adding device. Therefore, when the quality of water to be treated has fluctuated and the kind or the generated amount of coarse particles generated due to flocculation of inorganic matter or organic matter has changed, it is possible to adopt countermeasures such as adding a new filtration membrane cleaning agent corresponding to the quality of the water to be treated to the filtration membrane from the filtration membrane cleaning agent adding device serving as an auxiliary filtration membrane cleaning agent adding device, stopping addition of a filtration membrane cleaning agent, changing an added amount of a filtration membrane cleaning agent, or changing a kind of a filtration membrane cleaning agent. In addition, according to the water treatment apparatus of the present invention, since whether addition of a filtration membrane cleaning agent is required or not and the added amount of a filtration membrane cleaning agent can be controlled on the basis of measurement results from the water quality measurement device, it is possible to promptly cope therewith in response to fluctuation of the quality of water to be treated. Therefore, the water treatment apparatus has higher scalability.

Moreover, according to the water treatment apparatus of the present invention, at least two water quality adjuster adding devices provided in the reverse osmosis membrane treatment part are installed in advance to be able to add different water quality adjusters to water to be treated, and at least one of at least the two water quality adjuster adding devices is an auxiliary water quality adjuster adding device. Therefore, when the quality of water to be treated has fluctuated and a likelihood of occurrence of adhered matter onto the reverse osmosis membrane has changed, it is possible to adopt countermeasures such as adding a new water quality adjuster corresponding to the quality of the water to be treated to the reverse osmosis membrane from the water quality adjuster adding device serving as an auxiliary water quality adjuster adding device, stopping addition of a water quality adjuster, changing an added amount of a water quality adjuster, or changing a kind of a water quality adjuster. In addition, according to the water treatment apparatus of the present invention, since whether addition of a water quality adjuster is required or not and the added amount of a water quality adjuster can be controlled on the basis of measurement results from the water quality measurement device, it is possible to promptly cope therewith in response to fluctuation of the quality of water to be treated. Therefore, the water treatment apparatus has higher scalability.

Moreover, according to the water treatment apparatus of the present invention, at least two reverse osmosis membrane cleaning agent adding devices provided in the reverse osmosis membrane treatment part are installed in advance to be able to add different reverse osmosis membrane cleaning agents to the reverse osmosis membrane, and at least one of at least the two reverse osmosis membrane cleaning agent adding devices is an auxiliary reverse osmosis membrane cleaning agent adding device. Therefore, when the quality of water to be treated has fluctuated and the kind or the amount of adhered matter which has adhered to the reverse osmosis membrane has changed, it is possible to adopt countermeasures such as adding a new reverse osmosis membrane cleaning agent corresponding to the quality of the water to be treated to the reverse osmosis membrane from the reverse osmosis membrane cleaning agent adding device serving as an auxiliary reverse osmosis membrane cleaning agent adding device, stopping addition of a reverse osmosis membrane cleaning agent, changing an added amount of a reverse osmosis membrane cleaning agent, or changing a kind of a reverse osmosis membrane cleaning agent. In addition, according to the water treatment apparatus of the present invention, since whether addition of a reverse osmosis membrane cleaning agent is required or not and the added amount of a reverse osmosis membrane cleaning agent can be controlled on the basis of measurement results from the water quality measurement device, it is possible to promptly cope therewith in response to fluctuation of the quality of water to be treated. Therefore, the water treatment apparatus has higher scalability.

DESCRIPTION OF EMBODIMENT

A water treatment apparatus and a water treatment method of an embodiment of the present invention will be described.

Figure 1:
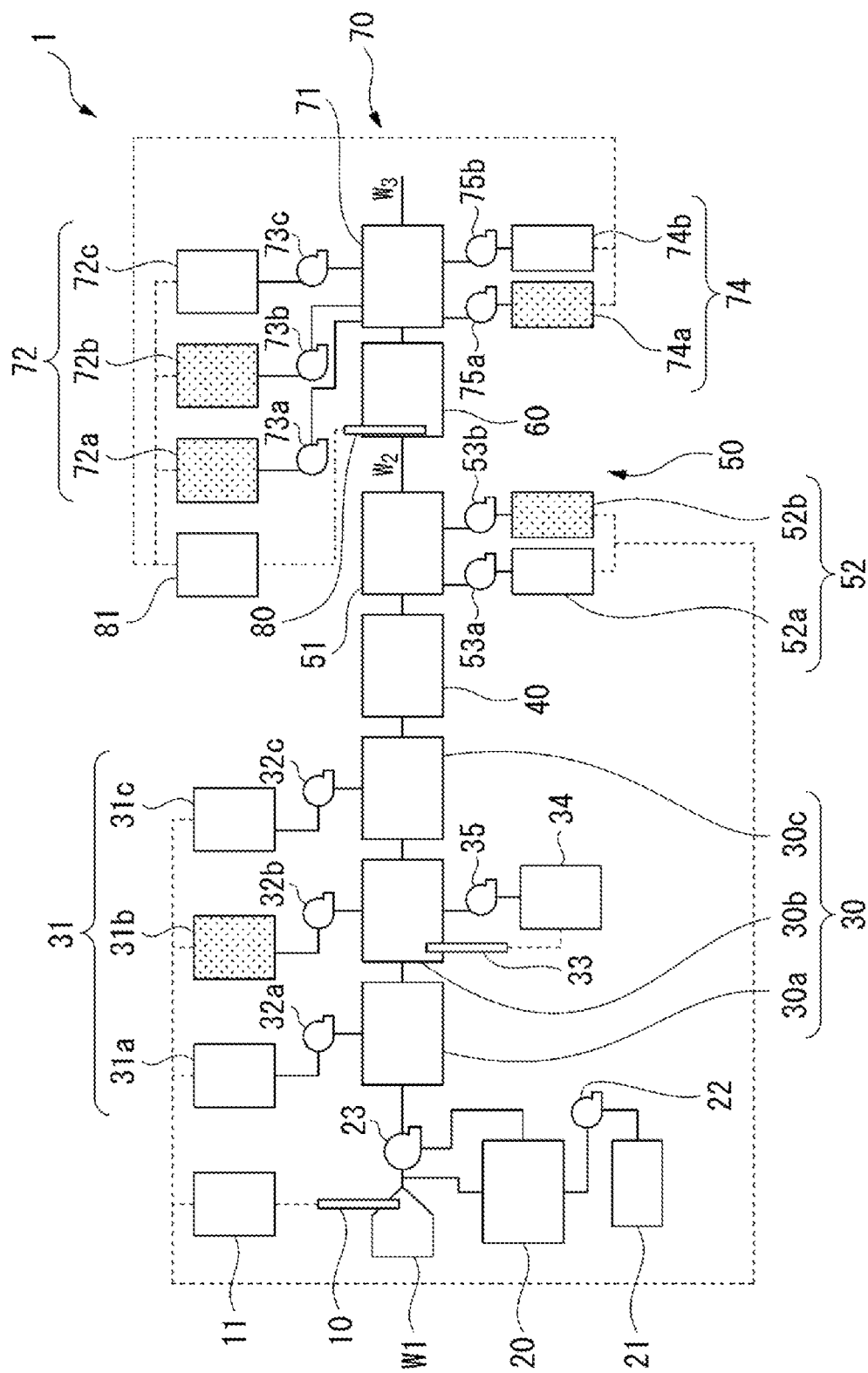
FIG. 1 is an explanatory schematic view of an example of a water treatment apparatus according to an embodiment of the present invention, and a water treatment method using this apparatus.

FIG. 1 is an explanatory schematic view of an example of the water treatment apparatus according to the embodiment of the present invention and the water treatment method using this apparatus. A water treatment apparatus 1 illustrated in FIG. 1 is constituted on the assumption of a case in which water W1 to be treated (treatment target) includes inorganic matter (having a carbonate concentration with a carbonic acid content of 25 mg/L or lower) and scarcely includes organic matter (having a concentration of organic matter of which a molecular weight is 10,000 or larger with a carbon content of 300 μmL or lower). However, the quality of water to be treated (treatment target) is not limited thereto. The constitution of the water treatment apparatus 1 can be changed in accordance with the quality of water to be treated (treatment target).

As illustrated in FIG. 1, the water treatment apparatus 1 of the present embodiment includes a first water quality measurement device 10, a first controlling part 11, a first retention tank 20, a flocculation part 30, a flocculant adding device 31, a second retention tank 40, a membrane filtration treatment part 50, a third retention tank 60, and a reverse osmosis membrane treatment part 70.

The first water quality measurement device 10 is a device for measuring the quality of the water W1 to be treated. For example, measurement of the quality of the water W1 to be treated includes a turbidity, an electric conductivity, a pH, a concentration of inorganic matter (inorganic carbonic acid), a concentration of organic matter, and the like. A turbidity can be measured using a turbidity meter, an electric conductivity can be measured using an electric conductivity meter, and a pH can be measured using a pH meter. A concentration of inorganic matter (inorganic carbonic acid) can be measured using a non-dispersive infrared absorption method (NDIR method) or a gas permeable membrane conductivity measurement method. A concentration of organic matter can be measured using a TOC meter or an absorption photometer. A concentration of neutral polysaccharides (organic matter having a molecular weight of 10,000 or larger) of organic matter which may particularly cause biofouling can be measured using an organic carbon detection-type size exclusion chromatography method (LC-OCD method). Regarding the first water quality measurement device 10, when the quality of the water W1 to be treated fluctuates, another water quality measurement device for coping with change in the water W1 to be treated may be newly installed. The first water quality measurement device 10 is connected to the first controlling part 11.

The first controlling part 11 issues a command relating to whether addition of a flocculant from the flocculant adding device 31 is required or not and to an added amount of a flocculant on the basis of measurement results from the first water quality measurement device 10. In addition, the first controlling part 11 issues a command relating to whether addition of a filtration membrane cleaning agent used in the membrane filtration treatment part 50 is required or not and to an added amount of a filtration membrane cleaning agent.

The first retention tank 20 is a tank for temporarily retaining the water W1 to be treated. The first retention tank 20 includes an oxidant adding device 21. The oxidant adding device 21 is a device for adding an oxidant to the first retention tank 20. For example, sodium hypochlorite can be used as an oxidant. Organic matter which may cause biofouling can be subjected to oxidative decomposition by using sodium hypochlorite. An oxidant is added to the first retention tank 20 via a pump 22.

The flocculation part 30 is provided on a downstream side of the first retention tank 20 via a pump 23. The flocculation part 30 causes inorganic matter or organic matter included in the water W1 to be treated to flocculate by mixing the water W1 to be treated with a flocculant, thereby generating coarse particles. The flocculation part 30 includes three flocculation tanks consisting of a first flocculation tank 30a, a second flocculation tank 30b, and a third flocculation tank 30c. Three flocculation tanks are connected to each other in series. The second flocculation tank 30b is connected to the first flocculation tank 30a, and the third flocculation tank 30c is also connected to the second flocculation tank 30b.

The flocculant adding device 31 includes three devices consisting of a first flocculant adding device 31a, a second flocculant adding device 31b, and a third flocculant adding device 31c. The first flocculant adding device 31a, the second flocculant adding device 31b, and the third flocculant adding device 31c are installed in advance with respect to the flocculation part 30 to be able to add different flocculants to the flocculation part 30. That is, the first flocculant adding device 31a is installed in the first flocculation tank 30a, the second flocculant adding device 31b is installed in the second flocculation tank 30b, and the third flocculant adding device 31c is installed in the third flocculation tank 30c in advance, respectively.

The first flocculant adding device 31a is connected to the first controlling part 11 and adds a first flocculant to the first flocculation tank 30a via a pump 32a in response to a command issued from the first controlling part 11. The second flocculant adding device 31b is connected to the first controlling part 11 and adds a second flocculant to the second flocculation tank 30b via a pump 32b in response to a command issued from the first controlling part 11. The third flocculant adding device 31c is connected to the first controlling part 11 and adds a third flocculant to the third flocculation tank 30c via a pump 32c in response to a command issued from the first controlling part 11. It is preferable that each of the first flocculation tank 30a, the second flocculation tank 30b, and the third flocculation tank 30c include a stirring device (not illustrated) such that an added flocculant can be stirred and mixed in with the water W1 to be treated.

In the water treatment apparatus 1 illustrated in FIG. 1, the second flocculant adding device 31b is used. Thus, the second flocculant adding device 31b is filled with the second flocculant. On the other hand, the first flocculant adding device 31a and the third flocculant adding device 31c serve as auxiliary flocculant adding devices. For this reason, the first flocculant adding device 31a and the third flocculant adding device 31c are not filled with any flocculant.

For example, an inorganic flocculant is used as the second flocculant. Aluminum salt obtained by causing aluminum chloride, polyaluminum chloride, aluminum sulfate, aluminum hydroxide, or aluminum oxide to dissolve using a hydrochloric acid or a sulfuric acid; ferric chloride; ferric sulfate; ferrous sulfate; or the like can be used as an inorganic flocculant. However, the second flocculant is not limited to an inorganic flocculant. There is no particular limitation for the second flocculant as long as it can cause inorganic matter or organic matter included in the water W1 to be treated to flocculate and generate coarse particles.

The second flocculation tank 30b further includes a pH meter 33 and a pH adjuster adding device 34. The pH adjuster adding device 34 is a device for supplying a pH adjuster to the second flocculation tank 30b on the basis of the pH of the water W1 to be treated measured by the pH meter 33. For example, an acid agent such as a sulfuric acid or a hydrochloric acid, or an alkaline agent such as a sodium hydroxide or a calcium hydroxide can be used as a pH adjuster. The pH adjuster is added to the second flocculation tank 30b from the pH adjuster adding device 34 via a pump 35. The pH of the water W1 to be treated is adjusted to a pH suitable for the second flocculant (inorganic flocculant).

In the water treatment apparatus 1 illustrated in FIG. 1, as described above, the second flocculant adding device 31b is used, and the first flocculant adding device 31a and the third flocculant adding device 31c serve as auxiliary flocculant adding devices. However, easiness of flocculation of inorganic matter or organic matter included in the water W1 to be treated may change in response to change in the water W1 to be treated. Due to this change in easiness of flocculation of inorganic matter or organic matter, it may be difficult to cause inorganic matter or organic matter to flocculate and generate coarse particles by simply using the second flocculant. In this case, in place of the second flocculant or in addition to the second flocculant, one of or both the first flocculant and the third flocculant are added to the water W1 to be treated using one of or both the first flocculant adding device 31a and the third flocculant adding device 31c. Moreover, it is possible to adopt countermeasures such as stopping addition of a flocculant, changing an added amount of a flocculant, or changing a kind of a flocculant.

For example, a flocculant which is highly effective in flocculation of organic matter (particularly, organic matter having low affinity with an inorganic flocculant) in the water W1 to be treated can be used as the first flocculant. A polymer compound having a phenolic hydroxyl group can be used as such a flocculant. For example, the flocculant disclosed in Japanese Patent Laid-Open No. 2015-157265 can be used as a polymer compound having a phenolic hydroxyl group. It is preferable that a polymer compound having a phenolic hydroxyl group be a novolac-type phenolic resin. KURIVERTER (registered trademark) BP201 sold by Kurita Water Industries Ltd. can be used as the first flocculant. In addition, a melamine formaldehyde resin acid colloidal solution disclosed in Japanese Patent Laid-Open No. 2017-131871 may be used as the first flocculant.

For example, a flocculant having an effect of further enlarging flocculated matter generated by means of the first flocculant or the second flocculant can be used as the third flocculant. A cationic polymer flocculant can be used as such a flocculant. A cationic polymer flocculant has an effect of enlarging flocculated matter by being adsorbed into the flocculated matter due to electric charges. The flocculant disclosed in Japanese Patent Laid-Open No. 2017-131871 can be used as a cationic polymer flocculant. ZetaAce (registered trademark) P702 sold by Kurita Water Industries Ltd. can be used as the third flocculant.

The second retention tank 40 is provided on a downstream side of the third flocculation tank 30c. The second retention tank 40 is a tank for temporarily storing the water W1 to be treated to which a flocculant is added and supplying it to the membrane filtration treatment part 50 on a downstream side.

The membrane filtration treatment part 50 is provided on a downstream side of the second retention tank 40. The membrane filtration treatment part 50 includes a filtration membrane 51 for performing membrane filtration treatment of the water W1 to be treated, a filtration membrane cleaning agent adding device 52, the first water quality measurement device 10, and the first controlling part 11.

The membrane filtration treatment part 50 separates and removes coarse particles included in the water W1 to be treated by performing filtration treatment of the water W1 to be treated using the filtration membrane 51. A microfiltration membrane (MF membrane) or an ultrafiltration membrane (UF membrane) can be used as the filtration membrane 51.

The filtration membrane cleaning agent adding device 52 includes two devices consisting of a first filtration membrane cleaning agent adding device 52a and a second filtration membrane cleaning agent adding device 52b. The first filtration membrane cleaning agent adding device 52a and the second filtration membrane cleaning agent adding device 52b are installed in advance as devices constituting the membrane filtration treatment part 50 to be able to add different filtration membrane cleaning agents to the filtration membrane 51. A chemical agent having a function of recovering a filtration performance of the filtration membrane 51 which has deteriorated due to coarse particles by cleaning the filtration membrane 51 and removing coarse particles which have been separated and removed by the filtration membrane 51 can be used as a filtration membrane cleaning agent. The number of filtration membrane cleaning agent adding devices 52 is not limited to two. There may be one filtration membrane cleaning agent adding device 52, but it is preferable to provide at least two devices, and it is particularly preferable to provide the devices within a range of two to five.

The first filtration membrane cleaning agent adding device 52a is connected to the first controlling part 11 and adds a first filtration membrane cleaning agent to the filtration membrane 51 via a pump 53a in response to a command issued from the first controlling part 11. The second filtration membrane cleaning agent adding device 52b is connected to the first controlling part 11 and adds a second filtration membrane cleaning agent to the filtration membrane 51 via a pump 53b in response to a command issued from the first controlling part 11.

In the water treatment apparatus 1 illustrated in FIG. 1, the second filtration membrane cleaning agent adding device 52b is used. Thus, the second filtration membrane cleaning agent adding device 52b is filled with the second filtration membrane cleaning agent. On the other hand, the first filtration membrane cleaning agent adding device 52a is an auxiliary filtration membrane cleaning agent adding device. For this reason, the first filtration membrane cleaning agent adding device 52a is not filled with any cleaning agent.

For example, a cleaning agent for removing inorganic matter is used as the second filtration membrane cleaning agent. A cleaning agent for removing inorganic matter is a chemical agent having a high ability to remove coarse particles of inorganic matter. For example, as a cleaning agent for removing inorganic matter, an acid-based chemical such as a hydrochloric acid, a sulfuric acid, or an oxalic acid can be used alone, an acidic chemical for causing the pH to be 3.0 or lower can be used by being mixed in therewith, or a reductant can be used in combination therewith in order to make oxidized inorganic matter easy to be removed.

In the water treatment apparatus 1 illustrated in FIG. 1, as described above, the second filtration membrane cleaning agent adding device 52b is used, and the first filtration membrane cleaning agent adding device 52a serves as an auxiliary filtration membrane cleaning agent adding device. However, the kind or the generated amount of coarse particles generated due to flocculation of inorganic matter or organic matter included in the water W1 to be treated may change in response to change in the water W1 to be treated. Due to this change in the kind or the generated amount of coarse particles, it may be difficult to remove coarse particles by simply using the second filtration membrane cleaning agent. In this case, in place of the second filtration membrane cleaning agent or in addition to the second filtration membrane cleaning agent, the first filtration membrane cleaning agent is added to the filtration membrane 51 using the first filtration membrane cleaning agent adding device 52a. Moreover, it is possible to adopt countermeasures such as stopping addition of a filtration membrane cleaning agent, changing an added amount of a filtration membrane cleaning agent, or changing a kind of a filtration membrane cleaning agent.

The filtration membrane cleaning agent is not limited to a cleaning agent for removing inorganic matter. The filtration membrane cleaning agent is appropriately selected and used depending on the kind or the adhered amount of adhered matter which has adhered to the filtration membrane 51. Examples of a reverse osmosis membrane cleaning agent other than a cleaning agent for removing inorganic matter can include a cleaning agent for removing organic matter. A cleaning agent for removing organic matter is a chemical agent having a high ability to remove coarse particles of organic matter. For example, as a cleaning agent for removing organic matter, an alkaline chemical for causing the pH to be 12 or higher using an oxidant (sodium hypochlorite or the like), a sodium hydroxide, or the like can be used alone, or at least two kinds can be used in combination.

The third retention tank 60 is provided on a downstream side of the membrane filtration treatment part 50. The third retention tank 60 is a tank for temporarily storing membrane filtration-treated water W2 subjected to membrane filtration treatment by the membrane filtration treatment part 50 and supplying it to the reverse osmosis membrane treatment part 70 on a downstream side.

The reverse osmosis membrane treatment part 70 is provided on a downstream side of the third retention tank 60.

The reverse osmosis membrane treatment part 70 includes a reverse osmosis membrane 71 for performing reverse osmosis membrane treatment of the membrane filtration-treated water W2 (water to be treated subjected to treatment by the reverse osmosis membrane treatment part 70), a water quality adjuster adding device 72, a reverse osmosis membrane cleaning agent adding device 74, a second water quality measurement device 80, and a second controlling part 81.

The reverse osmosis membrane treatment part 70 desalinates the membrane filtration-treated water W2 through reverse osmosis membrane treatment using the reverse osmosis membrane 71. High-purity treated water W3 is generated through this reverse osmosis membrane treatment. There is no particular limitation for the reverse osmosis membrane 71, and a known reverse osmosis membrane used for reverse osmosis membrane treatment can be used.

The second water quality measurement device 80 is a device for measuring the quality of the membrane filtration-treated water W2. For example, measurement of the quality of the membrane filtration-treated water W2 includes a turbidity, an electric conductivity, a pH, a concentration of inorganic carbonic acid, a concentration of organic matter, and the like. The method for measuring water quality is the same as that of the first water quality measurement device 10. The second water quality measurement device 80 is installed in the third retention tank 60.

The second water quality measurement device 80 is connected to the second controlling part 81. The second controlling part 81 is connected to the water quality adjuster adding device 72 and the reverse osmosis membrane cleaning agent adding device 74 and issues a command relating to whether addition of a water quality adjuster and a reverse osmosis membrane cleaning agent is required or not and to added amounts thereof. For example, the added amounts of the water quality adjuster and the reverse osmosis membrane cleaning agent can be determined through a desk test using the membrane filtration-treated water W2.

The water quality adjuster adding device 72 includes three devices consisting of a first water quality adjuster adding device 72a, a second water quality adjuster adding device 72b, and a third water quality adjuster adding device 72c. The first water quality adjuster adding device 72a, the second water quality adjuster adding device 72b, and the third water quality adjuster adding device 72c are installed in advance as devices constituting the reverse osmosis membrane treatment part 70 to be able to add different water quality adjusters to the membrane filtration-treated water W2. A chemical agent for curbing alteration of the reverse osmosis membrane 71, a chemical agent for curbing occurrence of adhered matter adhering to the reverse osmosis membrane 71, or the like can be used as a water quality adjuster. The number of water quality adjuster adding devices 72 is not limited to three. There may be one water quality adjuster adding device 72, but it is preferable to provide at least two devices, and it is particularly preferable to provide the devices within a range of two to five.

The first water quality adjuster adding device 72a is connected to the second controlling part 81 and adds a first water quality adjuster to the membrane filtration-treated water W2 via a pump 73a in response to a command issued from the second controlling part 81. The second water quality adjuster adding device 72b is connected to the second controlling part 81 and adds a second water quality adjuster to the membrane filtration-treated water W2 via a pump 73b in response to a command issued from the second controlling part 81. The third water quality adjuster adding device 72c is connected to the second controlling part 81 and adds a third water quality adjuster to the membrane filtration-treated water W2 via a pump 73c in response to a command issued from the second controlling part 81.

In the water treatment apparatus 1 illustrated in FIG. 1, the first water quality adjuster adding device 72a and the second water quality adjuster adding device 72b are used. Thus, the first water quality adjuster adding device 72a is filled with the first water quality adjuster, and the second water quality adjuster adding device 72b is filled with the second water quality adjuster. The third water quality adjuster adding device 72c is an auxiliary water quality adjuster adding device. For this reason, the third water quality adjuster adding device 72c is not filled with any water quality adjuster.

For example, a reductant is used as the first water quality adjuster. A reductant decomposes and removes an oxidant added to the water W1 to be treated by the oxidant adding device 21 on an upstream side. An oxidant is a substance which is likely to cause the reverse osmosis membrane 71 to alter. Thus, alteration of the reverse osmosis membrane 71 can be curbed by using a reductant. A sodium bisulfate can be used as a reductant.

For example, a biofouling inhibitor is used as the second water quality adjuster. A biofouling inhibitor curbs occurrence of a phenomenon in which biofilms adhere to the reverse osmosis membrane 71 and cause clogging in the reverse osmosis membrane 71 (biofouling). If an oxidant is neutralized by adding a reductant to the membrane filtration-treated water W2 as the first water quality adjuster, there is concern that biofouling is likely to occur. For this reason, a biofouling inhibitor is added to the membrane filtration-treated water W2 as the second water quality adjuster. For example, the biofouling inhibitors disclosed in Japanese Patent Laid-Open No. 2016-221500 and Japanese Patent Laid-Open No. 2014-211327 can be used as a biofouling inhibitor. Particularly, DBNPA disclosed in Japanese Patent Laid-Open No. 2016-221500, a mixture of Cl-MIT and MIT (product name "KATHON"), ammonia chloramine, chlorosulfamic acid, or stabilized hypobromous acid-based slime control agent (produced by Organo Corporation, product name "Orpersion E266 series", and produced by Nalco Company, product name "STABREX") can be favorably used.

In the water treatment apparatus 1 illustrated in FIG. 1, as described above, the first water quality adjuster adding device 72a and the second water quality adjuster adding device 72b are used, and the third water quality adjuster adding device 72c serves as an auxiliary water quality adjuster adding device. However, the kind or the concentration of a substance included in the membrane filtration-treated water W2 may change in response to change in the water W1 to be treated. Due to this change in the membrane filtration-treated water W2, it may be difficult to curb alteration of the reverse osmosis membrane 71 or curb occurrence of adhered matter adhering to the reverse osmosis membrane 71 by simply using the first water quality adjuster and the second water quality adjuster. In this case, in place of the first water quality adjuster and the second water quality adjuster or in addition to the first water quality adjuster and the second water quality adjuster, the third water quality adjuster is added to the reverse osmosis membrane 71 using the third water quality adjuster adding device 72c. Moreover, it is possible to adopt countermeasures such as stopping addition of a water quality adjuster, changing an added amount of a water quality adjuster, or changing a kind of a water quality adjuster.

The water quality adjuster is not limited to a reductant and a biofouling inhibitor. The water quality adjuster is appropriately selected and used depending on the quality of the membrane filtration-treated water W2. Examples of a water quality adjuster other than a reductant and a biofouling inhibitor can include a scale inhibitor. A scale inhibitor is a chemical agent for curbing adhesion of scale to the reverse osmosis membrane 71. A high-molecular scale inhibitor or a low-molecular scale inhibitor such as phosphonic acid can be used as a scale inhibitor.

The reverse osmosis membrane cleaning agent adding device 74 includes two devices consisting of a first reverse osmosis membrane cleaning agent adding device 74a and a second reverse osmosis membrane cleaning agent adding device 74b. The first reverse osmosis membrane cleaning agent adding device 74a and the second reverse osmosis membrane cleaning agent adding device 74b are installed in advance as devices constituting the reverse osmosis membrane treatment part 70 to be able to add different reverse osmosis membrane cleaning agents to the reverse osmosis membrane 71. A reverse osmosis membrane cleaning agent is a chemical agent for recovering a desalination performance of the reverse osmosis membrane 71 which has deteriorated due to adhered matter by cleaning the reverse osmosis membrane 71 and removing adhered matter which has adhered to the reverse osmosis membrane 71. The number of reverse osmosis membrane cleaning agent adding devices 74 is not limited to two. There may be one reverse osmosis membrane cleaning agent adding device 74, but it is preferable to provide at least two devices, and it is particularly preferable to provide the devices within a range of two to five.

The first reverse osmosis membrane cleaning agent adding device 74a is connected to the second controlling part 81 and adds the first water quality adjuster to the reverse osmosis membrane 71 via a pump 75a in response to a command issued from the second controlling part 81. The second reverse osmosis membrane cleaning agent adding device 74b is connected to the second controlling part 81 and adds the second water quality adjuster to the reverse osmosis membrane 71 via a pump 75b in response to a command issued from the second controlling part 81.

In the water treatment apparatus 1 illustrated in FIG. 1, the first reverse osmosis membrane cleaning agent adding device 74a is used. Thus, the first reverse osmosis membrane cleaning agent adding device 74a is filled with a first reverse osmosis membrane cleaning agent. On the other hand, the second reverse osmosis membrane cleaning agent adding device 74b is an auxiliary reverse osmosis membrane cleaning agent adding device. For this reason, the second reverse osmosis membrane cleaning agent adding device 74b is not filled with any reverse osmosis membrane cleaning agent.

For example, a cleaning agent for removing biofilms is used as the first reverse osmosis membrane cleaning agent. A cleaning agent for removing biofilms is a chemical agent having a high ability to remove biofilms which have adhered to the reverse osmosis membrane 71. An alkaline chemical for causing the pH to be 12 or higher using sodium hydroxide or the like can be used as a cleaning agent for removing biofilms.

In the water treatment apparatus 1 illustrated in FIG. 1, as described above, the first reverse osmosis membrane cleaning agent adding device 74a is used, and the second reverse osmosis membrane cleaning agent adding device 74b serves as an auxiliary reverse osmosis membrane cleaning agent adding device. However, the membrane filtration-treated water W2 may change and the kind or the adhered amount of adhered matter adhering to the reverse osmosis membrane 71 may change in response to change in the water W1 to be treated. Due to this change in the kind or the adhered amount of adhered matter, it may be difficult to remove adhered matter by simply using the first reverse osmosis membrane cleaning agent. In this case, in place of the first reverse osmosis membrane cleaning agent or in addition to the first reverse osmosis membrane cleaning agent, a second reverse osmosis membrane cleaning agent is added to the reverse osmosis membrane 71 using the second reverse osmosis membrane cleaning agent adding device 74b. Moreover, it is possible to adopt countermeasures such as stopping addition of a reverse osmosis membrane cleaning agent, changing an added amount of a reverse osmosis membrane cleaning agent, or changing a kind of a reverse osmosis membrane cleaning agent.

The reverse osmosis membrane cleaning agent is not limited to a cleaning agent for removing biofilms. The reverse osmosis membrane cleaning agent is appropriately selected and used depending on the kind or the adhered amount of adhered matter which has adhered to the reverse osmosis membrane 71. Examples of a reverse osmosis membrane cleaning agent other than a cleaning agent for removing biofilms can include a cleaning agent for removing scale. A cleaning agent for removing scale is a chemical agent having a high ability to remove scale which has adhered to the reverse osmosis membrane 71. As a cleaning agent for removing scale, an acid-based chemical such as a hydrochloric acid, a sulfuric acid, or an oxalic acid can be used alone, or an acidic chemical for causing the pH to be within 1.5 to 4.0 can be used by being mixed in therewith.

Next, with reference to FIG. 1, the water treatment method of the present embodiment will be described. In the water treatment method of the present embodiment, a first water quality measurement step, a first control step, a first retention step, a flocculation step, a second retention step, a membrane filtration treatment step, a third retention step, a second water quality measurement step, a second control step, and a reverse osmosis membrane treatment step are performed. In addition, as necessary, a filtration membrane cleaning step and a reverse osmosis membrane cleaning step are performed. Hereinafter, each of the steps will be described.

In the first water quality measurement step, the quality of the water W1 to be treated is measured using the first water quality measurement device 10. Measurement of the quality of the water W1 to be treated may be regularly performed at certain time intervals or may be irregularly performed in response to change in environment such as rainfall or temperature.

In the first control step, a command relating to whether addition of the second flocculant (inorganic flocculant) is required or not and to the added amount is issued to the second flocculant adding device 31b using the first controlling part 11 on the basis of the quality of the water W1 to be treated obtained in the first water quality measurement step. In addition, in the first control step, a command relating to whether addition of the second filtration membrane cleaning agent (cleaning agent for removing inorganic matter) is required or not and to the added amount is issued to the second filtration membrane cleaning agent adding device 52b. It is preferable to determine the added amounts of the second flocculant and the second filtration membrane cleaning agent by performing a desk test in advance using the water W1 to be treated.

In the first retention step, the water W1 to be treated is retained in the first retention tank 20. Subsequently, an oxidant is supplied to the first retention tank 20 using the oxidant adding device 21. When a sodium hypochlorite is used as an oxidant, it is preferable that the added amount of the oxidant with respect to the water W1 to be treated be an amount within a range of 0.2 to 0.5 mg/L as a chlorine content ($Cl_2$). Due to addition of an oxidant, organic matter in the water W1 to be treated is subjected to oxidative decomposition, and occurrence of biofouling is curbed. The water W1 to be treated having an oxidant added thereto is sent to the first flocculation tank 30a via the pump 23.

In the flocculation step, the second flocculant is added to the water W1 to be treated using the second flocculant adding device 31b. That is, the water W1 to be treated introduced into the first flocculation tank 30a is sent to the second flocculation tank 30b as it is. In the second flocculation tank 30b, the water W1 to be treated and the second flocculant (inorganic flocculant) are stirred and mixed, and the second flocculant is uniformly added to the water W1 to be treated. Accordingly, inorganic matter such as carbonate in the water W1 to be treated is caused to flocculate and coarse particles of inorganic matter are generated. The water W1 to be treated including coarse particles of inorganic matter is sent to the third flocculation tank 30c and is sent to the second retention tank 40 as it is.

In the second retention step, the water W1 to be treated is temporarily retained in the second retention tank 40. The water W1 to be treated temporarily retained in the second retention tank 40 is sent to the membrane filtration treatment part 50.

In the membrane filtration treatment step, the water W1 to be treated including coarse particles of inorganic matter is subjected to the membrane filtration treatment and coarse particles of inorganic matter are separated and removed using the filtration membrane 51. The membrane filtration-treated water W2 from which coarse particles of inorganic matter are removed is sent to the third retention tank 60.

In the third retention step, the membrane filtration-treated water W2 is temporarily retained in the third retention tank 60. The membrane filtration-treated water W2 temporarily retained in the third retention tank 60 is sent to the reverse osmosis membrane treatment part 70.

In the second water quality measurement step, physical properties of the membrane filtration-treated water W2 are measured using the second water quality measurement device 80. Measurement of the water quality may be regularly performed at certain time intervals or may be irregularly performed.

In the second control step, a command relating to whether addition of the first water quality adjuster (reductant) is required or not and to the added amount is issued to the first water quality adjuster adding device 72a and a command relating to whether addition of the second water quality adjuster (biofouling inhibitor) is required or not and to the added amount is issued to the second water quality adjuster adding device 72b using the second controlling part 81 on the basis of the quality of the membrane filtration-treated water W2 obtained in the second water quality measurement step. In addition, in the second control step, a command relating to the added amount of the first reverse osmosis membrane cleaning agent (cleaning agent for removing biofilms) to the first reverse osmosis membrane cleaning agent adding device 74a is issued. It is preferable to determine the added amounts of the first water quality adjuster, the second water quality adjuster, and the first reverse osmosis membrane cleaning agent by performing a desk test in advance using the membrane filtration-treated water W2.

In the reverse osmosis membrane treatment step, the first water quality adjuster and the second water quality adjuster are added to the membrane filtration-treated water W2 using the first water quality adjuster adding device 72a and the second water quality adjuster adding device 72b. Subsequently, the membrane filtration-treated water W2 is subjected to reverse osmosis membrane treatment using the reverse osmosis membrane 71. The high-purity treated water W3 is generated through this reverse osmosis membrane treatment. Since an oxidant added by the oxidant adding device 21 on an upstream side is neutralized by adding the first water quality adjuster (reductant) to the membrane filtration-treated water W2, alteration of the reverse osmosis membrane 71 due to an oxidant can be curbed. In addition, occurrence of biofouling can be curbed by adding the second water quality adjuster (biofouling inhibitor) to the membrane filtration-treated water W2.

Next, the filtration membrane cleaning step and the reverse osmosis membrane cleaning step will be described.

In the filtration membrane cleaning step, and the filtration membrane 51 is cleaned by adding the second filtration membrane cleaning agent to the filtration membrane 51 using the second filtration membrane cleaning agent adding device 52b. For example, cleaning is performed by dipping the filtration membrane 51 into the second filtration membrane cleaning agent (cleaning agent for removing inorganic matter). Since filtration efficiency of the filtration membrane 51 is recovered by cleaning the filtration membrane 51 using the second filtration membrane cleaning agent and removing coarse particles of inorganic matter separated and removed by the filtration membrane 51, membrane filtration treatment by the filtration membrane 51 can be stably performed. While the filtration membrane cleaning step is performed, the water W1 to be treated is retained in the second retention tank 40, and the membrane filtration treatment step is stopped.

In the reverse osmosis membrane cleaning step, the reverse osmosis membrane 71 is cleaned by adding the first reverse osmosis membrane cleaning agent to the reverse osmosis membrane 71 using the first reverse osmosis membrane cleaning agent adding device 74a. For example, cleaning is performed by dipping the reverse osmosis membrane 71 into the first reverse osmosis membrane cleaning agent (cleaning agent for removing biofilms). Since desalination efficiency of the reverse osmosis membrane 71 is recovered by cleaning the reverse osmosis membrane 71 using the first reverse osmosis membrane cleaning agent and removing biofilms which have adhered to the reverse osmosis membrane 71, reverse osmosis membrane treatment by the reverse osmosis membrane 71 can be stably performed. While the reverse osmosis membrane cleaning step is performed, the membrane filtration-treated water W2 is retained in the third retention tank 60, and the reverse osmosis membrane treatment step is stopped.

As above, according to the water treatment method using the water treatment apparatus 1 illustrated in FIG. 1, the water W1 to be treated including inorganic matter and scarcely including organic matter can be efficiently made into the high-purity treated water W3.

Next, a method for countermeasures in a case in which the quality of the water W1 to be treated has fluctuated will be described.

A case in which the quality of the water W1 to be treated has fluctuated denotes that, for example, treatment efficiency of the water W1 to be treated by the water treatment apparatus 1 deteriorates due to variation in the kind or the concentration of inorganic matter or organic matter, increase or decrease in amount of water to be treated. For example, in water treatment apparatuses installed outdoors, incorporation of rainwater or the like may be a factor causing fluctuation of the quality of the water W1 to be treated. In addition, in water treatment apparatuses for industrial wastewater, increase or decrease of production lines in a factory, change in production object or production raw material, and the like may be the factors. However, factors causing fluctuation of the quality of the water W1 to be treated are not limited to these.

Figure 2:
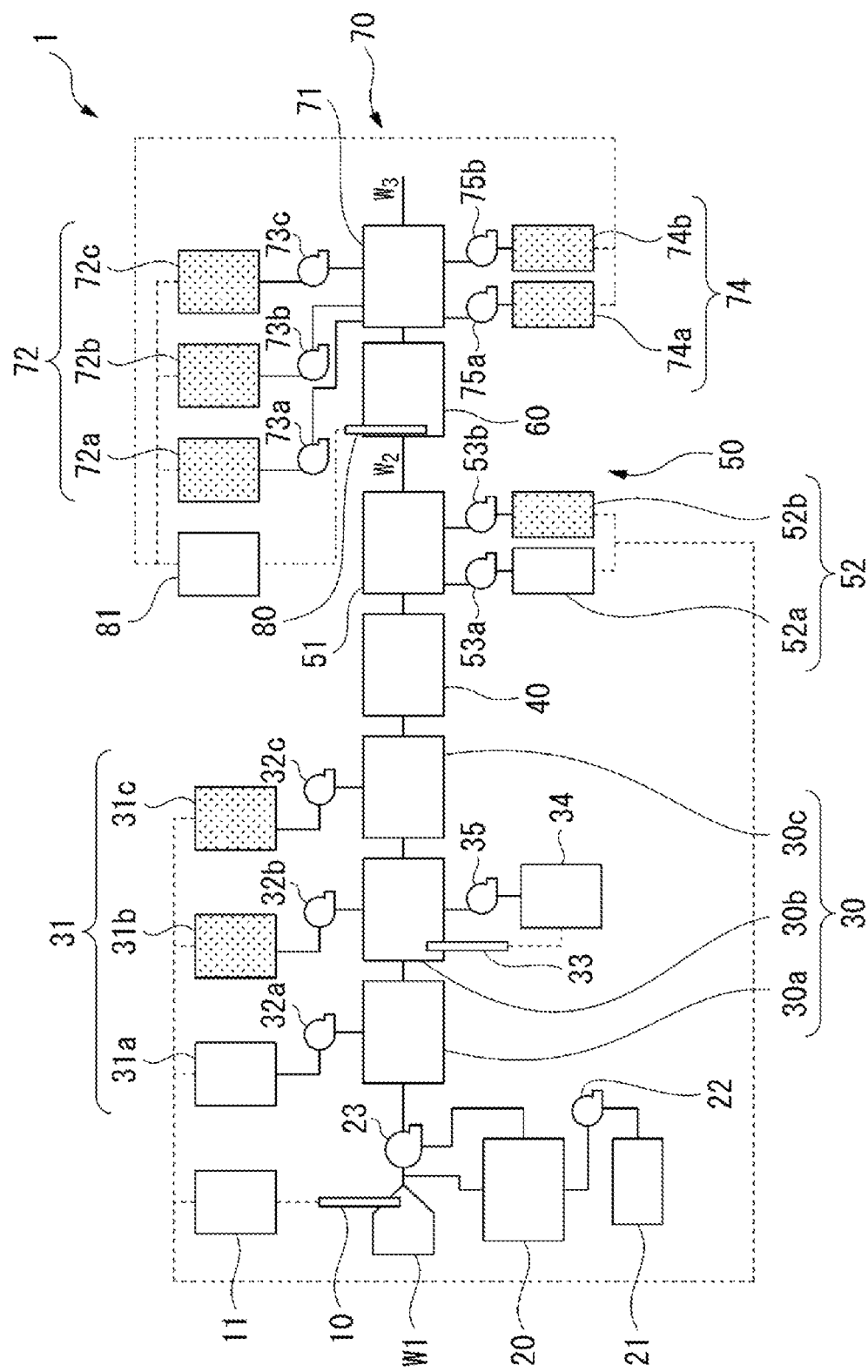
FIG. 2 is an explanatory schematic view of another example of the water treatment apparatus according to the embodiment of the present invention, and the water treatment method using this apparatus.

FIG. 2 is an explanatory schematic view of another example of the water treatment apparatus according to the embodiment of the present invention, and the water treatment method using this apparatus. The water treatment apparatus illustrated in FIG. 2 has a constitution coping with a case in which the water W1 to be treated includes a large amount of inorganic matter (having a carbonate concentration with a carbonic acid content exceeding 25 mg/L) and scarcely includes organic matter (having a concentration of organic matter of which a molecular weight is 10,000 or larger with a carbon content of 300 μm/L or lower). When the water W1 to be treated includes a large amount of inorganic matter, it may be difficult to cause inorganic matter to flocculate and generate coarse particles by simply using one kind of flocculant. In addition, inorganic matter may remain in water to be treated (membrane filtration-treated water W2) after membrane filtration treatment, the inorganic matter may precipitate in the reverse osmosis membrane, and scale may be generated. For this reason, in the water treatment method using the water treatment apparatus 1 illustrated in FIG. 1, there is concern that treatment efficiency of the water W1 to be treated may deteriorate. Since the water treatment apparatus 1 illustrated in FIG. 2 has the same constituent elements as the water treatment apparatus 1 illustrated in FIG. 1, the same reference signs as those in FIG. 1 are applied, and description thereof will be omitted or simplified.

The water treatment apparatus 1 illustrated in FIG. 2 differs from the water treatment apparatus 1 illustrated in FIG. 1 in forms of using the flocculant adding device 31, the water quality adjuster adding device 72, and the reverse osmosis membrane cleaning agent adding device 74. That is, in the flocculant adding device 31, in addition to the second flocculant adding device 31b, the third flocculant adding device 31c is used, and the first flocculant adding device 31a is an auxiliary flocculant adding device. For example, an inorganic flocculant is used as the second flocculant. For example, a cationic polymer flocculant is used as the third flocculant. In addition, the water quality adjuster adding device 72 uses the third water quality adjuster adding device 72c in addition to the first water quality adjuster adding device 72a and the second water quality adjuster adding device 72b. For example, a reductant is used as the first water quality adjuster. For example, a biofouling inhibitor is used as the second water quality adjuster. For example, a scale inhibitor is used as the third water quality adjuster. In the reverse osmosis membrane cleaning agent adding device 74, the second reverse osmosis membrane cleaning agent adding device 74b is used in addition to the first reverse osmosis membrane cleaning agent adding device 74a. For example, a cleaning agent for removing biofilms is used as the first reverse osmosis membrane cleaning agent. For example, a cleaning agent for removing scale is used as the second reverse osmosis membrane cleaning agent.

Next, the water treatment method using the water treatment apparatus 1 illustrated in FIG. 2 will be described focusing on differences from the water treatment method using the water treatment apparatus 1 illustrated in FIG. 1.

In the first control step, a command relating to whether addition of the second flocculant (inorganic flocculant) is required or not and to the added amount is issued to the second flocculant adding device 31b and a command relating to whether addition of the third flocculant (cationic polymer flocculant) is required or not and to the added amount is issued to the third flocculant adding device 31c using the first controlling part 11 on the basis of the physical properties of the water W1 to be treated obtained in the first water quality measurement step. It is preferable to determine the added amounts of the second flocculant and the third flocculant by performing a desk test in advance using the water W1 to be treated.

In the flocculation step, the third flocculant is added to the water W1 to be treated in addition to the second flocculant using the third flocculant adding device 31c together with the second flocculant adding device 31b. That is, the water W1 to be treated introduced into the first flocculation tank 30a is sent to the second flocculation tank 30b as it is. In the second flocculation tank 30b, the water W1 to be treated and the second flocculant (inorganic flocculant) are stirred and mixed, and the water W1 to be treated is uniformly added to the second flocculant. Accordingly, inorganic matter in the water W1 to be treated is caused to flocculate. Next, the water W1 to be treated is sent to the third flocculation tank 30c. In the third flocculation tank 30c, the water W1 to be treated and the third flocculant (cationic polymer flocculant) are stirred and mixed, so that the third flocculant is uniformly added to the water W1 to be treated. Accordingly, flocculated matter of inorganic matter is enlarged. In this manner, even when the water W1 to be treated includes a large amount of inorganic matter, inorganic matter can be caused to sufficiently flocculate, and coarse particles can be generated by adding the third flocculant to the water W1 to be treated in addition to the second flocculant.

In the second control step, a command relating to whether addition of the first water quality adjuster (reductant) is required or not and to the added amount is issued to the first water quality adjuster adding device 72a, a command relating to whether addition of the second water quality adjuster (biofouling inhibitor) is required or not and to the added amount is issued to the second water quality adjuster adding device 72b, and a command relating to the added amount of the third water quality adjuster (scale inhibitor) is issued to the third water quality adjuster adding device 72c using the second controlling part 81 on the basis of the quality of the membrane filtration-treated water W2 obtained in the second water quality measurement step. In addition, in the second control step, a command relating to whether addition of the first reverse osmosis membrane cleaning agent (cleaning agent for removing biofilms) is required or not and to the added amount is issued to the first reverse osmosis membrane cleaning agent adding device 74a and a command relating to whether addition of the second reverse osmosis membrane cleaning agent (cleaning agent for removing scale) is required or not and to the added amount is issued to the second reverse osmosis membrane cleaning agent adding device 74b. It is preferable to determine the added amounts of the first water quality adjuster, the second water quality adjuster, the third water quality adjuster, the first reverse osmosis membrane cleaning agent, and the second reverse osmosis membrane cleaning agent by performing a desk test in advance using the membrane filtration-treated water W2.

In the reverse osmosis membrane treatment step, the third water quality adjuster is added to the membrane filtration-treated water W2 in addition to the first water quality adjuster and the second water quality adjuster using the third water quality adjuster adding device 72c together with the first water quality adjuster adding device 72a and the second water quality adjuster adding device 72b. An effect of adding the first water quality adjuster and the second water quality adjuster to the membrane filtration-treated water W2 is the same as that in the case of the water treatment method using the water treatment apparatus 1 illustrated in FIG. 1. That is, alteration of the reverse osmosis membrane 71 due to an oxidant can be curbed by adding the first water quality adjuster (reductant). In addition, occurrence of biofouling can be curbed by adding the second water quality adjuster (biofouling inhibitor). Moreover, precipitation of inorganic matter included in the membrane filtration-treated water W2 on a surface of the reverse osmosis membrane 71 and generation of scale can be curbed by adding the third water quality adjuster (scale inhibitor). In this manner, even when inorganic matter remains in the membrane filtration-treated water W2, adhesion of scale to the reverse osmosis membrane 71 can be curbed by adding the third water quality adjuster to the filtration-treated water W2 in addition to the first water quality adjuster and the second water quality adjuster.

In the reverse osmosis membrane cleaning step, the reverse osmosis membrane 71 is cleaned by adding the second reverse osmosis membrane cleaning agent to the reverse osmosis membrane 71 in addition to the first reverse osmosis membrane cleaning agent using the second reverse osmosis membrane cleaning agent adding device 74b together with the first reverse osmosis membrane cleaning agent adding device 74a. In the same manner as that in the case of the water treatment method using the water treatment apparatus 1 illustrated in FIG. 1, biofilms which have adhered to the reverse osmosis membrane 71 can be removed by cleaning the reverse osmosis membrane 71 using the first reverse osmosis membrane cleaning agent (cleaning agent for removing biofilms). Moreover, scale which has adhered to the reverse osmosis membrane 71 can be removed by cleaning the reverse osmosis membrane 71 using the second reverse osmosis membrane cleaning agent (cleaning agent for removing scale). In this manner, biofilms and scale which have adhered to the reverse osmosis membrane 71 can be removed by adding the second reverse osmosis membrane cleaning agent to the reverse osmosis membrane 71 in addition to the first reverse osmosis membrane cleaning agent.

As above, according to the water treatment method using the water treatment apparatus 1 illustrated in FIG. 2, even when the water W1 to be treated includes a large amount of inorganic matter and scarcely includes organic matter, the water W1 to be treated can be efficiently made into the high-purity treated water W3.

Figure 3:
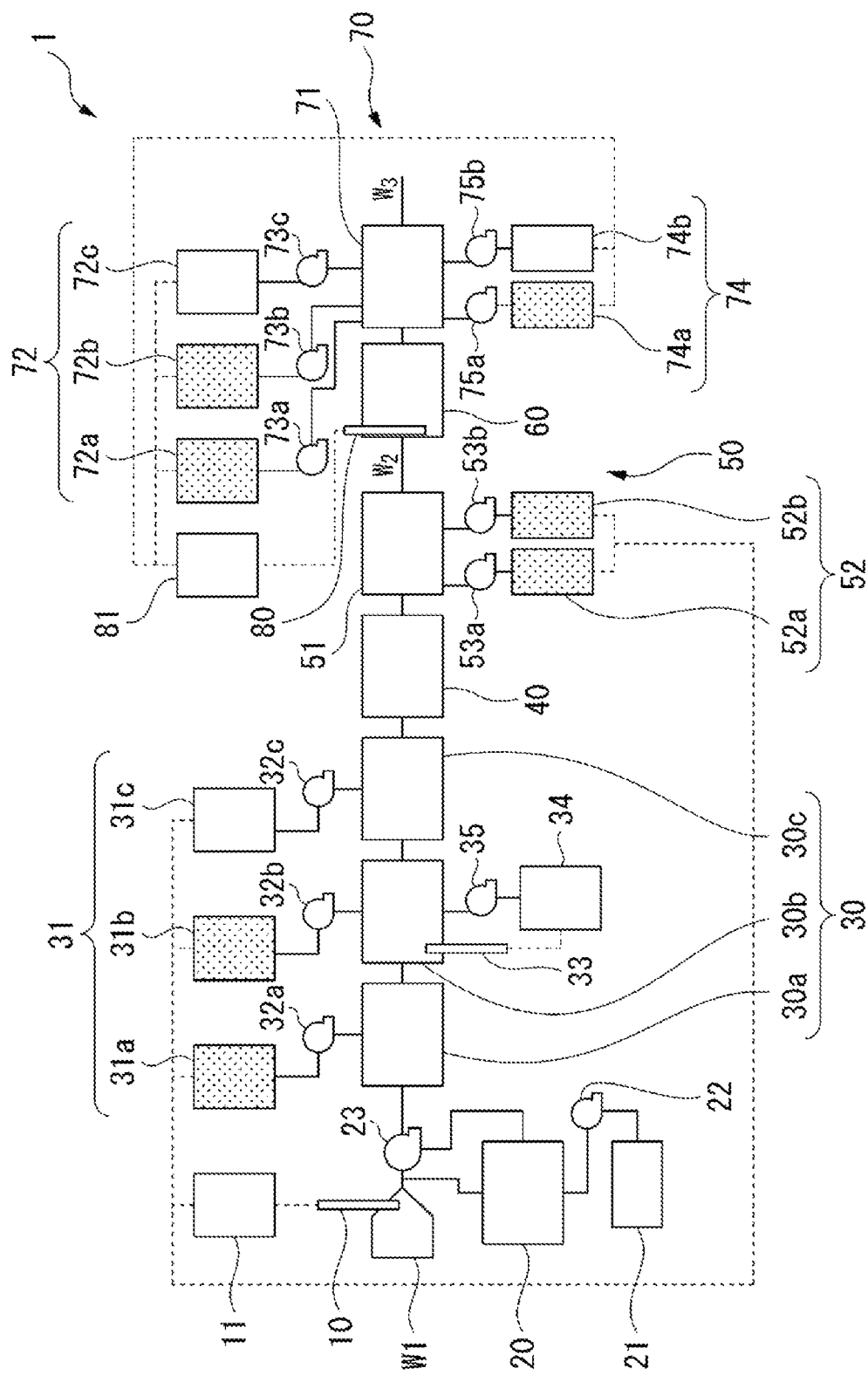
FIG. 3 is an explanatory schematic view of still another example of the water treatment apparatus according to the embodiment of the present invention, and the water treatment method using this apparatus.

FIG. 3 is an explanatory schematic view of another example of the water treatment apparatus according to the embodiment of the present invention, and the water treatment method using this apparatus. The water treatment apparatus illustrated in FIG. 3 has a constitution coping with a case in which the water W1 to be treated includes inorganic matter (however, having a carbonate concentration with a carbonic acid content of 25 mg/L or lower) and includes organic matter (having a concentration of organic matter of which a molecular weight of 10,000 or larger with a carbon content exceeding 300 µm/L). When the water W1 to be treated includes organic matter, it is difficult to cause both inorganic matter and organic matter to sufficiently flocculate and thus it may be difficult to generate coarse particles by simply using one kind of flocculant. In addition, one of or both inorganic matter and organic matter may remain in water to be treated (membrane filtration-treated water W2) after membrane filtration treatment, and thus biofilms or scale may adhere to the reverse osmosis membrane. For this reason, in the water treatment method using the water treatment apparatus 1 illustrated in FIG. 1, there is concern that treatment efficiency of the water W1 to be treated may deteriorate. Since the water treatment apparatus 1 illustrated in FIG. 3 has the same constituent elements as the water treatment apparatus 1 illustrated in FIG. 1, the same reference signs as those in FIG. 1 are applied, and description thereof will be omitted or simplified.

The water treatment apparatus 1 illustrated in FIG. 3 differs from the water treatment apparatus 1 illustrated in FIG. 1 in forms of using the flocculant adding device 31 and the filtration membrane cleaning agent adding device 52. That is, in the flocculant adding device 31, the first flocculant adding device 31a is used in addition to the second flocculant adding device 31b, and the third flocculant adding device 31c is an auxiliary flocculant adding device. For example, a polymer compound having a phenolic hydroxyl group is used as the first flocculant. For example, an inorganic flocculant is used as the second flocculant. In addition, in the filtration membrane cleaning agent adding device 52, the first filtration membrane cleaning agent adding device 52a is used in addition to the second filtration membrane cleaning agent adding device 52*b*. For example, a cleaning agent for removing organic matter is used as the first filtration membrane cleaning agent. For example, a cleaning agent for removing inorganic matter is used as the second filtration membrane cleaning agent.

Next, the water treatment method using the water treatment apparatus 1 illustrated in FIG. 3 will be described focusing on differences from the water treatment method using the water treatment apparatus 1 illustrated in FIG. 1.

In the first control step, a command relating to whether addition of the first flocculant (polymer compound having a phenolic hydroxyl group) is required or not and to the added amount is issued to the first flocculant adding device 31*a* and a command relating to whether addition of the second flocculant (inorganic flocculant) is required or not and to the added amount is issued to the second flocculant adding device 31*b* using the first controlling part 11 on the basis of the physical properties of the water W1 to be treated obtained in the first water quality measurement step. In addition, in the first control step, a command relating to whether addition of the first filtration membrane cleaning agent (cleaning agent for removing organic matter) is required or not and to the added amount is issued to the first filtration membrane cleaning agent adding device 52*a* and a command relating to whether addition of the second filtration membrane cleaning agent (cleaning agent for removing inorganic matter) is required or not and to the added amount is issued to the second filtration membrane cleaning agent adding device 52*b*.

In the flocculation step, the first flocculant is added to the water W1 to be treated in addition to the second flocculant using the first flocculant adding device 31*a* together with the second flocculant adding device 31*b*. That is, in the first flocculation tank 30*a*, the water W1 to be treated and the first flocculant (polymer compound having a phenolic hydroxyl group) are stirred and mixed, and the water W1 to be treated is uniformly mixed in with the first flocculant. Accordingly, organic matter in the water W1 to be treated is caused to flocculate, and coarse particles of organic matter are generated. Next, the water W1 to be treated is sent to the second flocculation tank 30*b*. In the second flocculation tank 30*b*, the water W1 to be treated and the second flocculant (inorganic flocculant) are stirred and mixed, and the water W1 to be treated is uniformly added to the second flocculant. Accordingly, inorganic matter in the water W1 to be treated is caused to flocculate, and coarse particles of inorganic matter are generated. In this manner, even when the water W1 to be treated includes inorganic matter and organic matter, both can be caused to sufficiently flocculate, and coarse particles of inorganic matter and coarse particles of organic matter can be generated by adding the first flocculant to the water W1 to be treated in addition to the second flocculant.

In the filtration membrane cleaning step, the filtration membrane 51 is cleaned by adding the first filtration membrane cleaning agent to the filtration membrane 51 in addition to the second filtration membrane cleaning agent using the first filtration membrane cleaning agent adding device 52*a* together with the second filtration membrane cleaning agent adding device 52*b*. In the same manner as that in the case of the water treatment method using the water treatment apparatus 1 illustrated in FIG. 1, coarse particles of inorganic matter separated and removed by the filtration membrane 51 can be removed by cleaning the filtration membrane 51 using the second filtration membrane cleaning agent (cleaning agent for removing inorganic matter). Moreover, coarse particles of organic matter separated and removed by the filtration membrane 51 can be removed by cleaning the filtration membrane 51 using the first filtration membrane cleaning agent (cleaning agent for removing organic matter). In this manner, coarse particles of inorganic matter and coarse particles of organic matter separated and removed by the filtration membrane 51 can be removed by adding the first filtration membrane cleaning agent to the filtration membrane 51 in addition to the second filtration membrane cleaning agent.

As above, according to the water treatment method using the water treatment apparatus 1 illustrated in FIG. 3, even when the water W1 to be treated includes inorganic matter and organic matter, the water W1 to be treated can be efficiently made into the high-purity treated water W3.

As described above, in the water treatment apparatus 1 used in the water treatment method of the present embodiment, at least two flocculant adding devices 31*a* to 31*c* are installed in advance to be able to add different flocculants to the flocculation part 30, at least one of at least the two flocculant adding devices 31*a* to 31*c* is an auxiliary flocculant adding device. For this reason, according to the water treatment method of the present embodiment, when the quality of the water W1 to be treated has fluctuated and easiness of flocculation of inorganic matter or organic matter in the water W1 to be treated has changed, it is possible to adopt countermeasures such as such as adding a new flocculant corresponding to the quality of the water W1 to be treated to the flocculation part 30 from the flocculant adding device 31 serving as an auxiliary flocculant adding device. Further, by adopting these countermeasures, inorganic matter or organic matter in the water W1 to be treated can be caused to more reliably flocculate into coarse particles. Therefore, the water treatment method of the present embodiment has high scalability.

In addition, according to the water treatment method of the present embodiment, since at least one of at least the two filtration membrane cleaning agent adding devices 52*a* and 52*b* installed in the water treatment apparatus 1 in advance is an auxiliary filtration membrane cleaning agent adding device, when the quality of the water W1 to be treated has fluctuated, it is possible to adopt countermeasures such as adding a new filtration membrane cleaning agent corresponding to the quality of the water W1 to be treated to the filtration membrane 51 from the filtration membrane cleaning agent adding device 52 serving as an auxiliary filtration membrane cleaning agent adding device. Further, by adopting the countermeasures, even when the quality of the water W1 to be treated has fluctuated and the kind or the generated amount of coarse particles generated due to flocculation of inorganic matter or organic matter has changed, coarse particles separated and removed by the filtration membrane 51 can be more reliably removed. Therefore, the water treatment method has higher scalability.

Moreover, according to the water treatment method of the present embodiment, since at least one of at least the two water quality adjuster adding devices 72*a* to 72*c* installed in the water treatment apparatus 1 in advance is an auxiliary water quality adjuster adding device, when the quality of the membrane filtration-treated water W2 has fluctuated, it is possible to adopt countermeasures such as adding a new water quality adjuster corresponding to the quality of the water to be treated to the membrane filtration-treated water W2 from the water quality adjuster adding device 72 serving as an auxiliary water quality adjuster adding device. Further, by adopting the countermeasures, even when the quality of the membrane filtration-treated water W2 has fluctuated and a likelihood of occurrence of adhered matter onto the reverse osmosis membrane 71 has changed, occurrence of adhered matter onto the reverse osmosis membrane 71 can be curbed. Therefore, the water treatment method has higher scalability.

Furthermore, according to the water treatment method of the present embodiment, since at least one of at least the two reverse osmosis membrane cleaning agent adding devices 74a and 74b installed in the water treatment apparatus 1 in advance is an auxiliary reverse osmosis membrane cleaning agent adding device, when the quality of the membrane filtration-treated water W2 has fluctuated, it is possible to adopt countermeasures such as adding a new reverse osmosis membrane cleaning agent corresponding to the quality of the membrane filtration-treated water W2 to the reverse osmosis membrane 71 from the reverse osmosis membrane cleaning agent adding device 74 serving as an auxiliary reverse osmosis membrane cleaning agent adding device. Further, by adopting the countermeasures, even when the quality of the membrane filtration-treated water W2 has fluctuated and the kind or the amount of adhered matter which has adhered to the reverse osmosis membrane 71 has changed, adhered matter which has adhered to the reverse osmosis membrane can be removed. Therefore, the water treatment apparatus 1 of the present embodiment has higher scalability.

According to the water treatment apparatus 1 of the present embodiment, since at least one of at least the two flocculant adding devices 31 which have been installed in advance to be able to add different flocculants to the flocculation part 30 is an auxiliary flocculant adding device, even when the quality of the water W1 to be treated has fluctuated and easiness of flocculation of inorganic matter or organic matter in water to be treated has changed, it is possible to adopt countermeasures such as adding a new flocculant corresponding to the quality of the water W1 to be treated to the flocculation part from the flocculant adding device 31 serving as an auxiliary flocculant adding device. In addition, according to the water treatment apparatus 1 of the present embodiment, since whether addition of a flocculant is required or not and the added amount of a flocculant can be controlled on the basis of measurement results from the first water quality measurement device 10, it is possible to promptly cope therewith in response to fluctuation of the quality of the water W1 to be treated.

In addition, according to the water treatment apparatus 1 of the present embodiment, since the flocculation part 30 has a constitution constituted of three flocculation tanks (the first flocculation tank 30a, the second flocculation tank 30b, and the third flocculation tank 30c) respectively corresponding to three flocculant adding devices (the first flocculant adding device 31a, the second flocculant adding device 31b, and the third flocculant adding device 31c) and the three flocculation tanks are connected to each other in series, different flocculants can be added in stages. Accordingly, impairing a flocculation effect due to interference between different flocculants can be curbed, and thus an effect of adding a flocculant can be more reliably exhibited. Therefore, inorganic matter or organic matter included in water to be treated can be caused to more reliably flocculate into coarse particles.

Moreover, according to the water treatment apparatus 1 of the present embodiment, since the membrane filtration treatment part 50 and the reverse osmosis membrane treatment part 70 are provided on a downstream side of the flocculation part 30, coarse particles included in water to be treated can be separated and removed by the membrane filtration treatment part 50, and since water to be treated can be desalinated by the reverse osmosis membrane treatment part 70, water to be treated can become high-purity treated water.

Moreover, according to the water treatment apparatus 1 of the present embodiment, since at least one of at least the two filtration membrane cleaning agent adding devices 52a and 52b is an auxiliary filtration membrane cleaning agent adding device, when the quality of the water W1 to be treated has fluctuated and the kind or the generated amount of coarse particles generated due to flocculation of inorganic matter or organic matter has changed, it is possible to adopt countermeasures such as adding a new filtration membrane cleaning agent corresponding to the quality of the water to be treated to the filtration membrane from the filtration membrane cleaning agent adding device 52 serving as an auxiliary filtration membrane cleaning agent adding device. In addition, according to the water treatment apparatus 1 of the present embodiment, since whether addition of a filtration membrane cleaning agent is required or not and the added amount of a filtration membrane cleaning agent can be controlled on the basis of measurement results from the first water quality measurement device 10, it is possible to promptly cope therewith in response to fluctuation of the quality of the water W1 to be treated. Therefore, the water treatment apparatus 1 has higher scalability.

Moreover, according to the water treatment apparatus 1 of the present embodiment, since at least one of at least the two water quality adjuster adding devices 72a to 72c is an auxiliary water quality adjuster adding device, when the quality of the membrane filtration-treated water W2 has fluctuated and a likelihood of occurrence of adhered matter onto the reverse osmosis membrane 71 has changed, it is possible to adopt countermeasures such as adding a new water quality adjuster corresponding to the quality of the membrane filtration-treated water W2 to the reverse osmosis membrane from the water quality adjuster adding device 72 serving as an auxiliary water quality adjuster adding device. In addition, according to the water treatment apparatus 1 of the present embodiment, since whether addition of a water quality adjuster is required or not and the added amount of a water quality adjuster can be controlled on the basis of measurement results from the second water quality measurement device 80, it is possible to promptly cope therewith in response to fluctuation of the quality of the membrane filtration-treated water W2. Therefore, the water treatment apparatus 1 has higher scalability.

Moreover, according to the water treatment apparatus 1 of the present embodiment, since at least one of at least the two reverse osmosis membrane cleaning agent adding devices 74a and 74b is an auxiliary reverse osmosis membrane cleaning agent adding device, when the quality of the membrane filtration-treated water W2 has fluctuated and the kind or the amount of adhered matter which has adhered to the reverse osmosis membrane 71 has changed, it is possible to adopt countermeasures such as adding a new reverse osmosis membrane cleaning agent corresponding to the quality of the membrane filtration-treated water W2 to the reverse osmosis membrane from the reverse osmosis membrane cleaning agent adding device 74 serving as an auxiliary reverse osmosis membrane cleaning agent adding device. In addition, according to the water treatment apparatus 1 of the present embodiment, since whether addition of a reverse osmosis membrane cleaning agent is required or not and the added amount of a reverse osmosis membrane cleaning agent can be controlled on the basis of measurement results from the second water quality measurement device 80, it is possible to promptly cope therewith in response to fluctuation of the quality of the membrane filtration-treated water W2. Therefore, the water treatment apparatus 1 has higher scalability.

The present invention is not limited to the foregoing embodiment, and various changes can be made within a range not departing from the gist of the invention.

Figure 4:
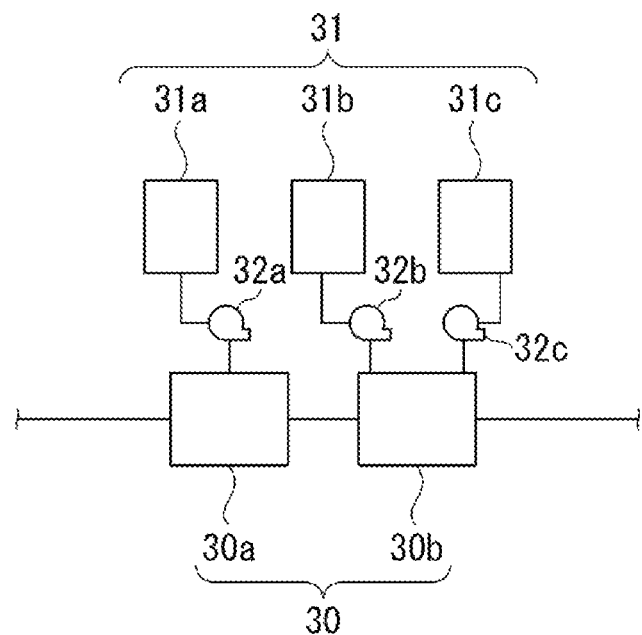
FIG. 4 is a partial schematic view illustrating another example of a flocculation part of the water treatment apparatus according to the embodiment of the present invention.
Figure 5:
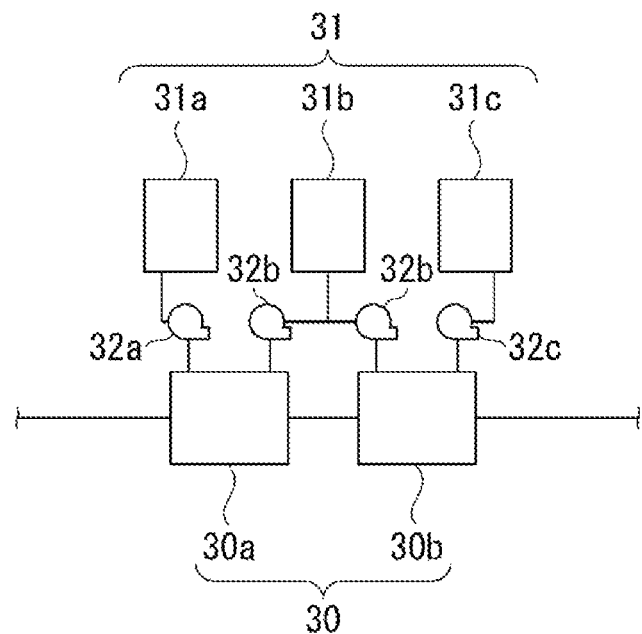
FIG. 5 is a partial schematic view illustrating still another example of the flocculation part of the water treatment apparatus according to the embodiment of the present invention.

For example, in the foregoing embodiment, a case in which the flocculation part 30 includes three flocculation tanks consisting of the first flocculation tank 30a, the second flocculation tank 30b, and the third flocculation tank 30c, and one flocculant adding device 31 is installed in each of the flocculation tanks has been described, but the number of flocculation tanks constituting the flocculation part 30 and the number of flocculant adding devices 31, and an installation method are not limited thereto. The number of flocculation tanks may be one, but it is preferable to provide at least two tanks, and it is particularly preferable to provide the tanks within a range of two to five. The number of flocculant adding devices 31 need only be at least two, but it is preferable to provide three or more devices, and it is particularly preferable to provide the devices within a range of three to five. In addition, at least two flocculant adding device 31 may be installed in one flocculation tank. FIGS. 4 and 5 illustrate examples of a constitution of the water treatment apparatus in which two flocculant adding devices 31 are installed in one flocculation tank.

In FIG. 4, the flocculation part 30 includes two flocculation tanks consisting of the first flocculation tank 30a and the second flocculation tank 30b. The second flocculation tank 30b is connected to the second retention tank (not illustrated). The first flocculant adding device 31a is installed in the first flocculation tank 30a, and the second flocculant adding device 31b and the third flocculant adding device 31c are installed in the second flocculation tank 30b.

In FIG. 5, the flocculation part 30 includes two flocculation tanks consisting of the first flocculation tank 30a and the second flocculation tank 30b. The second flocculation tank 30b is connected to the second retention tank (not illustrated). The first flocculant adding device 31a is installed in the first flocculation tank 30a, the second flocculant adding device 31b is installed in the first flocculation tank 30a and the second flocculation tank 30b, and the third flocculant adding device 31c is installed in the second flocculation tank 30b.

In addition, in the present embodiment, adjustment of whether addition of a flocculant is required or not and the added amount of a flocculant and adjustment of whether addition of a filtration membrane cleaning agent is required or not and the added amount of a filtration membrane cleaning agent are performed using the first controlling part 11, but they may be manually performed. In addition, adjustment of whether addition of a water quality adjuster is required or not and the added amount of a water quality adjuster and adjustment of whether addition of a reverse osmosis membrane cleaning agent is required or not and the added amount of a reverse osmosis membrane cleaning agent are performed using the second controlling part 81, but they may be manually performed.

EXAMPLES

Example 1

The water treatment apparatus 1 illustrated in FIG. 1 and three kinds of water A to water C to be treated as the water W1 to be treated were prepared. The following Table 1 shows physical properties of the water A to the water C to be treated and treatment conditions (added amount of a flocculant) of the water A to the water C to be treated determined on the basis of a desk test. A polymer compound having a phenolic hydroxyl group (BP201, produced by Kurita Water Industries Ltd.) was used as the first flocculant, a ferric chloride was used as the second flocculant, and a cationic polymer flocculant (ZetaAce P702, produced by Kurita Water Industries Ltd.) was used as the third flocculant.

TABLE 1

| Kind of water to be treated | Physical properties of water to be treated | | | Treatment conditions (added amount: mg/L) | | |
|---|---|---|---|---|---|---|
| | Turbidity (NTU) | Electric conductivity (mS/m) | pH (—) | First flocculant | Second flocculant | Third flocculant |
| Water A to be treated | 0.1 to 5 | 30 to 40 | 3.4 to 4.0 | Not added | 50 | Not added |
| Water B to be treated | 89 to 250 | 80 to 120 | 2.0 to 3.0 | Not added | 250 | 1 |
| Water C to be treated | 2 to 10 | 15 to 25 | 7.0 to 8.0 | 1 | 30 | Not added |

The water A to the water C to be treated were supplied to the water treatment apparatus 1 in a pattern in which the water A to be treated, the water B to be treated, and the water C to be treated were switched every 12 hours in this order of. The water A to the water C to be treated were supplied to the water treatment apparatus 1 in this pattern for two weeks, and water treatment was performed as follows.

In the first retention tank 20, using the oxidant adding device 21, a sodium hypochlorite was added to the water W1 to be treated such that the chlorine content ($Cl_2$) became 0.2 to 0.5 mg/L.

In the flocculation part 30, the water W1 to be treated was sent to the first flocculation tank 30a, the second flocculation tank 30b, and the third flocculation tank 30c in this order, and the added amounts of the first flocculant, the second flocculant, and the third flocculant were manually changed every time the kind of the water W1 to be treated was switched. In the second flocculation tank 30b, using the pH meter 33 and the pH adjuster adding device 34, the pH of the water W1 to be treated was adjusted to 6.0. A sulfuric acid and a sodium hydroxide were used as a pH adjuster.

In the membrane filtration treatment part 50, an ultrafiltration membrane (UF membrane: approximately 3.3 $m^2$) made of polyvinylidene fluoride was used as the filtration membrane 51.

In the reverse osmosis membrane treatment part 70, a polyamide membrane was used as the reverse osmosis membrane 71. In addition, in the reverse osmosis membrane treatment part 70, using the first water quality adjuster adding device 72a, the second water quality adjuster adding device 72b, and the third water quality adjuster adding device 72c, the first water quality adjuster (reductant), the second water quality adjuster (biofouling inhibitor), and the third water quality adjuster (scale inhibitor) were added to the water to be treated. A sodium bisulfate was used as a reductant, KURIVERTER IK110 (produced by Kurita Water Industries Ltd.) was used as a biofouling inhibitor, and KURIVERTER N500 (produced by Kurita Water Industries Ltd.) was used as a scale inhibitor. In addition, the reverse osmosis membrane treatment part 70 was operated while having a recovery rate set to 75%.

Example 2

Water treatment was performed in the same manner as that of Example 1, except that the filtration membrane 51 of the membrane filtration treatment part 50 was cleaned with a frequency of once every five days from the start of the water treatment. An aqueous solution including 0.1% of a sulfuric acid, including a sodium hypochlorite with a chlorine content ($Cl_2$) of 500 mg/L, and including 0.1% of a sodium hydroxide was used as a filtration membrane cleaning agent. The filtration membrane 51 was cleaned by adding the filtration membrane cleaning agent to the filtration membrane 51 and dipping the filtration membrane 51 into the filtration membrane cleaning agent for 30 minutes.

Example 3

In the first water quality measurement device 10, the quality of the water W1 to be treated (turbidity and pH) was measured. A turbidity meter (produced by HORIBA, Ltd.) was used for measurement of the turbidity, and a pH meter (produced by HORIBA, Ltd.) was used for measurement of the pH. In the first controlling part 11, from the measurement results of the turbidity and the pH, the kind of the water W1 to be treated was judged as follows, a command relating to whether addition of a flocculant is required or not and to the added amount was issued to each of the first flocculant adding device 31a, the second flocculant adding device 31b, and the third flocculant adding device 31c based on the judgment results and the treatment conditions in Table 1. Water treatment was performed in the same manner as that of Example 1, except for those above.
  When the pH was 7.0 or lower and the turbidity was 10 NTU or lower: water A to be treated
  When the pH was 7.0 or lower and the turbidity was 10 NTU or higher: water B to be treated
  When the pH was 7.0 or higher: water C to be treated Example 4

The process was performed in the same manner as that of Example 1, except that the added amount of the second flocculant (ferric chloride) was set as follows in accordance with the turbidity of the water to be treated when the first controlling part 11 judged that water to be treated corresponded to the water B to be treated.
  When the turbidity was lower than 100 NTU: 200 mg/L
  When the turbidity was 100 NTU or higher and lower than 150 NTU: 250 mg/L
  When the turbidity was 150 NTU or higher and lower than 200 NTU: 300 mg/L
  When the turbidity was 200 NTU or higher: 350 mg/L Example 5

Water treatment was performed in the same manner as that of Example 1, except that the reverse osmosis membrane 71 of the reverse osmosis membrane treatment part 70 was cleaned with a frequency of once every five days from the start of the water treatment. An oxalic acid solution including 0.1% of an oxalic acid was used as the reverse osmosis membrane cleaning agent. The reverse osmosis membrane 71 was cleaned by adding the reverse osmosis membrane cleaning agent to the reverse osmosis membrane 71 and dipping the reverse osmosis membrane 71 into the reverse osmosis membrane cleaning agent for 30 minutes.

Example 6

Water treatment was performed in the same manner as that of Example 3, except that the electric conductivity of the membrane filtration-treated water retained in the third retention tank 60 was measured using the second water quality measurement device 80, and the second controlling part 81 issued a command to the first water quality adjuster adding device 72a, the second water quality adjuster adding device 72b, and the third water quality adjuster adding device 72c such that a reductant and a biofouling inhibitor were added to the membrane filtration-treated water when the electric conductivity of the membrane filtration-treated water was 25 mS/m or lower, and a reductant, a scale inhibitor, and a biofouling inhibitor were added to the membrane filtration-treated water when the electric conductivity of the membrane filtration-treated water exceeded 25 mS/m.

Comparative Example 1

Water treatment was performed in the same manner as that of Example 1, except that only the second flocculant (ferric chloride) was added as a flocculant in an added amount of 250 mg/L, regardless of the kind of the water W1 to be treated.

Comparative Example 2

Water treatment was performed in the same manner as that of Example 1, except that the first flocculant (BP201, produced by Kurita Water Industries Ltd.) was added in an added amount of 1 mg/L, the second flocculant (ferric chloride) was added in an added amount of 250 mg/L, and the third flocculant (ZetaAce P702, produced by Kurita Water Industries Ltd.) was added in an added amount of 1 mg/L as flocculants regardless of the kind of the water W1 to be treated.
[Evaluation]
  After the water W1 to be treated was subjected to water treatment for approximately two months using the water treatment apparatus 1, the water treatment apparatus 1 was stopped. Subsequently, pure water was caused to pass through the water treatment apparatus 1 under a condition of 2 $m^3$/hr, and a differential pressure and a membrane filtration flux of the reverse osmosis membrane 71 when the pure water passed through the filtration membrane 51 were measured. The following Table 2 shows the results thereof.

TABLE 2

|  | Differential pressure when pure water passed through filtration membrane (UF membrane) after water treatment (kPa) | Membrane filtration flux when pure water passed through reverse osmosis membrane after water treatment (m³/m²/D) |
|---|---|---|
| Example 1 | 23 | 0.72 |
| Example 2 | 18 | 0.71 |
| Example 3 | 25 | 0.73 |
| Example 4 | 15 | 0.78 |
| Example 5 | 15 | 0.74 |
| Example 6 | 25 | 0.72 |
| Comparative Example 1 | 145 | 0.58 |
| Comparative Example 2 | 46 | 0.62 |

In Examples 1 to 5 in which whether addition of a flocculant is required or not and the added amount were adjusted in response to change in the water W1 to be treated, compared to Comparative Examples 1 to 2, the differential pressure when pure water passed through the filtration membrane (UF membrane) was reduced, and the membrane filtration flux of the reverse osmosis membrane increased. This is because, in Examples 1 to 5, the generation amount of coarse particles was rationalized due to adjustment of the flocculant so that the amount of coarse particles separated and removed by the filtration membrane was reduced, and the amount of inorganic matter or organic matter remaining in the membrane filtration-treated water W2 after membrane treatment was reduced so that adhered matter which has adhered to the reverse osmosis membrane were reduced. In addition, in Example 2 in which the filtration membrane 51 was cleaned, compared to Example 1, the differential pressure when pure water passed through the filtration membrane was reduced. This is because, in Example 2, coarse particles separated and removed by the filtration membrane 51 were removed. Moreover, in Example 4 in which the added amount of the second flocculant (ferric chloride) was changed in accordance with the turbidity of the water B to be treated, compared to Example 1, the differential pressure when pure water passed through the filtration membrane was reduced. This is because, in Example 4, the generation amount of coarse particles was rationalized due to further optimization of the flocculant so that the amount of coarse particles separated and removed by the filtration membrane was reduced. Furthermore, in Example 5 in which the reverse osmosis membrane was cleaned, compared to Example 1, the membrane filtration flux increased. This is because, in Example 5, adhered matter adhered to the reverse osmosis membrane 71 was removed. Furthermore, in Example 6 in which the water quality adjuster was adjusted in accordance with physical properties of the membrane filtration-treated water W2, water permeability of the reverse osmosis membrane was not significantly affected even though the added amount was reduced by causing the concentrations of chemicals to fluctuate depending on the water quality.

The invention claimed is:

1. A water treatment method using a water treatment apparatus which includes a flocculation part into which water to be treated is introduced and three flocculant adding devices configured to add different flocculants to the flocculation part, wherein one of the three flocculant adding devices is a non-auxiliary device that is controlled to be in continuous operation for adding the flocculants, and remaining two of the three flocculant adding devices are auxiliary flocculant adding devices that are controlled to be in operation in response to detection of a water quality fluctuation,
wherein when a quality of the water to be treated has fluctuated, adding a new flocculant corresponding to the quality of the water to be treated to the flocculation part from the auxiliary flocculant adding devices, stopping addition of a flocculant, changing an added amount of a flocculant, or changing a kind of a flocculant is started.

2. The water treatment method according to claim 1,
wherein the water treatment apparatus has a membrane filtration treatment part on a downstream side of the flocculation part,
wherein the membrane filtration treatment part includes a filtration membrane which performs membrane filtration treatment of water to be treated, and at least two filtration membrane cleaning agent adding devices configured to add different filtration membrane cleaning agents to the filtration membrane,
wherein at least one of the at least two filtration membrane cleaning agent adding devices is an auxiliary filtration membrane cleaning agent adding device, and
wherein when a quality of the water to be treated has fluctuated, adding a new filtration membrane cleaning agent corresponding to the quality of the water to be treated to the filtration membrane from the auxiliary filtration membrane cleaning agent adding device of the at least two filtration membrane cleaning agent adding devices, stopping addition of a filtration membrane cleaning agent, changing an added amount of a filtration membrane cleaning agent, or changing a kind of a filtration membrane cleaning agent is started.

3. The water treatment method according to claim 2,
wherein the water treatment apparatus has a reverse osmosis membrane treatment part on a downstream side of the membrane filtration treatment part,
wherein the reverse osmosis membrane treatment part includes a reverse osmosis membrane which performs reverse osmosis membrane treatment of water to be treated, and at least two water quality adjuster adding devices configured to add different water quality adjusters to the water to be treated,
wherein at least one of the at least two water quality adjuster adding devices is an auxiliary water quality adjuster adding device, and
wherein when a quality of the water to be treated has fluctuated, adding a new water quality adjuster corresponding to the quality of the water to be treated to the water to be treated from the auxiliary water quality adjuster adding device, stopping addition of a water quality adjuster, changing an added amount of a water quality adjuster, or changing a kind of a water quality adjuster is started.

4. The water treatment method according to claim 2, wherein the water treatment apparatus has a reverse osmosis membrane treatment part on a downstream side of the membrane filtration treatment part, wherein the reverse osmosis membrane treatment part includes a reverse osmosis membrane which performs reverse osmosis membrane treatment of water to be treated, and at least two reverse osmosis membrane cleaning agent adding devices configured to add different reverse osmosis membrane cleaning agents to the reverse osmosis membrane, wherein at least one of the at least two reverse osmosis membrane cleaning agent adding devices is an auxiliary reverse osmosis membrane cleaning agent adding device, and wherein when a quality of the water to be treated has fluctuated, adding a new reverse osmosis membrane cleaning agent corresponding to the quality of the water to be treated to the reverse osmosis membrane from the auxiliary reverse osmosis membrane cleaning agent adding device of the at least two reverse osmosis membrane cleaning agent adding devices, stopping addition of a reverse osmosis membrane cleaning agent, changing an added amount of a reverse osmosis membrane cleaning agent, or changing a kind of a reverse osmosis membrane cleaning agent is started.

5. A water treatment apparatus comprising:
a flocculation part into which water to be treated is introduced;
three flocculant adding devices configured to add different flocculants to the flocculation part, wherein one of the three flocculant adding devices is a non-auxiliary device that is controlled to be in continuous operation for adding the flocculants, and remaining two of the three flocculant adding devices are auxiliary flocculant adding devices that are controlled to be in operation in response to detection of a water quality fluctuation;
one or more water quality measurement devices which measure a quality of the water to be treated; and
a controlling part which issues, on the basis of measurement results from the one or more water quality measurement devices, a command relating to whether addition of the flocculants is required or not and to added amounts of the flocculants to the three flocculant adding devices.

6. The water treatment apparatus according to claim 5, wherein the flocculation part is constituted of at least two flocculation tanks, and the at least two flocculation tanks are connected to each other in series.

7. The water treatment apparatus according to claim 5 further comprising:
a membrane filtration treatment part on a downstream side of the flocculation part, and comprising a filtration membrane for performing membrane filtration treatment of the water to be treated; and
a reverse osmosis membrane treatment part on a downstream side of the membrane filtration treatment part, and comprising a reverse osmosis membrane for performing reverse osmosis membrane treatment of the water to be treated, wherein the water to be treated is subjected to treatment by the membrane filtration treatment part.

8. The water treatment apparatus according to claim 7, wherein the membrane filtration treatment part further includes
at least two filtration membrane cleaning agent adding devices configured to add different filtration membrane cleaning agents to the filtration membrane,
the one or more water quality measurement devices which measure a quality of the water to be treated, and
the controlling part which issues, on the basis of measurement results from the one or more water quality measurement devices, a command relating to whether addition of the filtration membrane cleaning agents is required or not and to added amounts of the filtration membrane cleaning agents to the at least two filtration membrane cleaning agent adding devices, and
wherein at least one of the at least two filtration membrane cleaning agent adding devices is an auxiliary filtration membrane cleaning agent adding device.

9. The water treatment apparatus according to claim 7, wherein the reverse osmosis membrane treatment part further includes
at least two water quality adjuster adding devices configured to add different water quality adjusters to the water to be treated,
the one or more water quality measurement devices which measure the quality of the water to be treated, and
the controlling part which issues, on the basis of measurement results from the one or more water quality measurement devices, a command relating to whether addition of the water quality adjusters is required or not and to added amounts of the water quality adjusters to the at least two water quality adjuster adding devices, and
wherein at least one of the at least two water quality adjuster adding devices is an auxiliary water quality adjuster adding device.

10. The water treatment apparatus according to claim 7, wherein the reverse osmosis membrane treatment part further includes
at least two reverse osmosis membrane cleaning agent adding devices configured to add different reverse osmosis membrane cleaning agents to the reverse osmosis membrane,
the one or more water quality measurement devices which measure a quality of the water to be treated, and
the controlling part which issues, on the basis of measurement results from the one or more water quality measurement devices, a command relating to whether addition of the reverse osmosis membrane cleaning agents is required or not and to added amounts of the reverse osmosis membrane cleaning agents to the at least two reverse osmosis membrane cleaning agent adding devices, and
wherein at least one of the at least two reverse osmosis membrane cleaning agent adding devices is an auxiliary reverse osmosis membrane cleaning agent adding device.

11. The water treatment apparatus according to claim 6 further comprising:
a membrane filtration treatment part on a downstream side of the flocculation part, and comprising a filtration membrane for performing membrane filtration treatment of the water to be treated; and a reverse osmosis membrane treatment part on a downstream side of the membrane filtration treatment part, and comprising a reverse osmosis membrane for performing reverse osmosis membrane treatment of the water to be treated, wherein the water to be treated is subjected to treatment by the membrane filtration treatment part.

\* \* \* \* \*